(12) United States Patent
Wessels et al.

(10) Patent No.: US 11,213,161 B2
(45) Date of Patent: Jan. 4, 2022

(54) SYSTEM FOR HEATING AND FROTHING A BEVERAGE, A DEVICE FOR HEATING AND FROTHING A BEVERAGE SUITABLE FOR BEING USED IN SUCH A SYSTEM, A FROTH WAND SUITABLE FOR BEING USED IN SUCH A SYSTEM AND A METHOD OF PREPARING A BEVERAGE USING SUCH A SYSTEM

(71) Applicant: Koninklijke Douwe Egberts B.V., Utrecht (NL)

(72) Inventors: Hendrikus Christinus Maria Wessels, Utrecht (NL); Hendrik Johan Dees, Utrecht (NL)

(73) Assignee: Koninklijke Douwe Egberts B.V., Utrecht (NL)

( * ) Notice: Subject to any disclaimer, the term of this patent is extended or adjusted under 35 U.S.C. 154(b) by 657 days.

(21) Appl. No.: 15/855,349

(22) Filed: Dec. 27, 2017

(65) Prior Publication Data
US 2018/0310752 A1 Nov. 1, 2018

Related U.S. Application Data

(63) Continuation of application No. PCT/NL2016/050465, filed on Jun. 30, 2016.

(30) Foreign Application Priority Data

Jul. 1, 2015 (NL) ..................... 2015068

(51) Int. Cl.
*A47J 31/44* (2006.01)
*A23F 5/26* (2006.01)
*A47J 31/58* (2006.01)

(52) U.S. Cl.
CPC ....... *A47J 31/4489* (2013.01); *A47J 31/4425* (2013.01); *A47J 31/58* (2013.01); *A23F 5/26* (2013.01)

(58) Field of Classification Search
CPC .... A47J 31/58; A47J 31/4425; A47J 31/4489; A47J 31/4407; A47J 31/4403;
(Continued)

(56) References Cited

U.S. PATENT DOCUMENTS

| 5,491,333 A | 2/1996 | Skell et al. |
| 6,100,518 A | 8/2000 | Miller |

(Continued)

FOREIGN PATENT DOCUMENTS

| DE | 19638355 | 4/1998 |
| DE | 20 2005 011 476 | 10/2005 |

(Continued)

OTHER PUBLICATIONS

International Search Report and Written Opinion, P101761US00, Koninklijke Douwe Egberts B.V., dated Jun. 30, 2016.

*Primary Examiner* — Ibrahime A Abraham
*Assistant Examiner* — Chris Q Liu
(74) *Attorney, Agent, or Firm* — Fitch, Even, Tabin & Flannery LLP

(57) ABSTRACT

A system for heating and frothing a beverage comprises a device for heating and frothing a beverage and a froth wand. The device for heating and frothing a beverage includes a steamer, a steam conduit connecting the steamer to a steam nozzle and a froth wand holder for removably holding a froth wand. The froth wand is a disposable froth wand and comprises a tubular wall having a steam inlet end comprising a steam inlet, a steam outlet end comprising a steam outlet separate from the steam inlet and a steam channel extending between the steam inlet and the steam outlet. The (Continued)

froth wand holder is arranged for holding the disposable froth wand at least in an operational position in the device for heating and frothing a beverage in which operational position the steam nozzle is in communication with the steam inlet of the disposable froth wand.

10 Claims, 17 Drawing Sheets

(58) Field of Classification Search
CPC ...... A47J 31/4485; A47J 31/44; A47J 31/002; A47J 31/46; A47J 31/36
USPC ...... 99/280, 281, 282, 283, 293, 295, 323.1, 99/325, 357
See application file for complete search history.

(56) References Cited

U.S. PATENT DOCUMENTS

| | | | |
|---|---|---|---|
| 6,118,104 A | | 9/2000 | Berkcan |
| 7,810,426 B2* | | 10/2010 | Balkau ............ A47J 31/4489 |
| | | | 99/323.1 |
| 7,946,219 B2* | | 5/2011 | Marconi ............ A47J 31/60 |
| | | | 99/323.1 |
| 8,522,670 B2* | | 9/2013 | Tonelli ............ A47J 31/58 |
| | | | 99/300 |
| 8,991,795 B2* | | 3/2015 | Studor ............ B01F 15/00253 |
| | | | 261/26 |
| 9,060,647 B2* | | 6/2015 | Rellis ............ A47J 31/4403 |
| 2003/0131735 A1 | | 7/2003 | Johnson et al. |
| 2005/0259508 A1 | | 11/2005 | Rohde |
| 2007/0017376 A1 | | 1/2007 | Oehninger |
| 2007/0196081 A1 | | 8/2007 | Startz |
| 2007/0240582 A1* | | 10/2007 | Eimer ............ A47J 31/4485 |
| | | | 99/323.3 |
| 2010/0323074 A1 | | 12/2010 | Fliegauf |
| 2012/0073449 A1* | | 3/2012 | Volonte ............ A47J 31/4489 |
| | | | 99/323.1 |
| 2012/0297989 A1* | | 11/2012 | Tonelli ............ A47J 31/4485 |
| | | | 99/293 |
| 2013/0145936 A1 | | 6/2013 | Dollner |
| 2014/0041529 A1* | | 2/2014 | Zhang ............ A47J 31/60 |
| | | | 99/323.1 |
| 2014/0305316 A1* | | 10/2014 | Sevcik ............ B67D 1/0877 |
| | | | 99/323.2 |
| 2015/0097303 A1* | | 4/2015 | Zhang ............ A47J 31/60 |
| | | | 261/161 |
| 2016/0150911 A1* | | 6/2016 | Upston ............ A47J 31/462 |
| | | | 99/285 |

FOREIGN PATENT DOCUMENTS

| | | |
|---|---|---|
| EP | 1 597 992 A1 | 11/2005 |
| EP | 1955623 | 8/2008 |
| EP | 2 263 502 | 12/2010 |
| EP | 2 433 527 | 3/2012 |
| EP | 2 534 986 A1 | 12/2012 |
| EP | 2 570 059 | 3/2013 |
| EP | 2 606 783 A1 | 6/2013 |
| EP | 2764806 | 8/2014 |
| GB | 2374856 | 10/2002 |
| WO | WO-01/88187 | 11/2001 |
| WO | WO-03/092458 | 11/2003 |
| WO | 2005063093 | 7/2005 |
| WO | WO-2005/5102126 | 11/2005 |
| WO | WO-2008/049162 | 5/2008 |
| WO | WO-2010/121299 | 10/2010 |
| WO | WO-2016025992 A1 * | 2/2016 ........ A47J 31/4403 |

* cited by examiner

SYSTEM FOR HEATING AND FROTHING A BEVERAGE, A DEVICE FOR HEATING AND FROTHING A BEVERAGE SUITABLE FOR BEING USED IN SUCH A SYSTEM, A FROTH WAND SUITABLE FOR BEING USED IN SUCH A SYSTEM AND A METHOD OF PREPARING A BEVERAGE USING SUCH A SYSTEM

CROSS-REFERENCE TO RELATED APPLICATIONS

This application is a continuation of PCT/NL2016/050465, filed Jun. 30, 2016, which claims the benefit of and priority to Netherlands Application No. NL 2015068, filed Jul. 1, 2015, the entire contents of each of which are incorporated herein by reference.

BACKGROUND

The invention relates to a system for heating and frothing a beverage, said system comprising a device for heating and frothing a beverage and a froth wand, said device for heating and frothing a beverage including a steamer, a steam conduit connecting the steamer to a steam nozzle and a froth wand holder for removably holding a froth wand.

Such a system for heating and frothing a beverage is e.g. known from US-A1-2003/0131735. This known system comprises an elongate frothing wand that includes a generally tubular external sleeve and an inner core within the external sleeve. The inner core defines a steam conduit configured to pass steam from a supply end of the froth wand to an expulsion end of the froth wand configured to eject steam into the beverage. The inner core further includes a coupling mechanism, configured to facilitate connection of the froth wand to a steam supply of beverage preparation device. The coupling mechanism may include threads, clamps, grooves, quick connect mechanisms, or other suitable fasteners complementarily configured to connect with steam supply and allow for easy de-coupling and re-coupling of the frothing wand from the steam supply to facilitate maintenance and cleaning. In addition the external sleeve may be easily removed facilitating cleaning and repair. For example, the external sleeve may be easily removed after a beverage of one flavor is prepared, so as to minimize the risk of imparting an undesired flavor to a subsequently prepared beverage. In addition, several different external sleeves individually configured to accommodate specific functions may be interchangeably coupled to the frothing wand, thus diversifying the utility of the frothing wand. Although the known system allows for removing the froth wand in order to clean the froth wand, de-coupling and re-coupling of the froth wand including cleaning the froth wand requires a lot of time. In particular it is desirable from a hygienic point of view that the froth wand is de-coupled, cleaned and re-coupled each time is has been used and this makes the use of such a system somewhat impractical, with the result that users of the system frequently refrain from cleaning the froth wand after it has been used, which could lead to health risks. In addition, a contaminated froth wand may also contaminate the inside of the beverage preparation device, which inside device contamination may be hard to remove.

SUMMARY

It is therefore an object of the invention to provide a system for heating and frothing a beverage with which a beverage can be heated and frothed hygienically. It is furthermore an object of the invention to provide a system for heating and frothing a beverage in which contamination of the device for heating and frothing a beverage as a result of a contaminated froth wand can at least largely be prevented. It is furthermore an object of the invention to provide a system for heating and frothing a beverage which is very user friendly thereby providing a more appealing manner of preparing a beverage.

In order to achieve at least one of the above identified objects the invention provides a system for heating and frothing a beverage, said system comprising a device for heating and frothing a beverage and a froth wand, said device for heating and frothing a beverage including a steamer, a steam conduit connecting the steamer to a steam nozzle and a froth wand holder for removably holding a froth wand, said froth wand being a disposable froth wand comprising a tubular wall having a steam inlet end comprising a steam inlet, a steam outlet end comprising a steam outlet separate from the steam inlet and a steam channel extending between the steam inlet and the steam outlet, said froth wand holder being arranged for holding the disposable froth wand at least in an operational position in the device for heating and frothing a beverage in which operational position the steam nozzle is in communication with the steam inlet of the disposable froth wand. By using a disposable froth wand instead of a reusable froth wand the system for heating and frothing a beverage can be used in a very hygienic manner, while at the same time two separate beverages can be prepared in a shorter time period since cleaning of a used froth wand can be dispensed with.

In an environmental advantageous embodiment of a system for heating and frothing a beverage according to the invention the disposable froth wand is made of biodegradable material.

Amongst other things dependent on the preference of a user and the kind of beverage to be heated or frothed the steam outlet can extend radially through the tubular wall or can be arranged at a free end of the froth wand extending in longitudinal direction. It has appeared that the orientation of the steam outlet influences the frothing and this orientation can thus be used to adapt the frothing to at least some extent to the preference of a user. In addition, frothing seems to be influenced by the number of steam openings forming the steam outlet, and consequently in a further embodiment of a system for heating and frothing a beverage the steam outlet comprises one or more outlet openings.

In a further embodiment of a system for heating and frothing a beverage according to the invention heating a frothing a beverage can be realized in a reproducible and effective manner when the steam outlet is a circular opening having a diameter of between 1.0 mm and 2.0 mm. In an alternative embodiment the steam outlet can comprise several steam outlet openings.

In a still further embodiment of a system for heating and frothing a beverage according to the invention the froth wand comprises a porous element adjacent the steam outlet. It has appeared that frothing can be influenced by providing a porous element in the steam outlet and such a porous element can thus be used to adapt the frothing to at least some extent to the preference of a user.

In an advantageous embodiment of a system for heating and frothing a beverage according to the invention the steam channel has a diameter of between 4 mm and 10 mm. In this manner heating of frothing of a beverage can be realized effectively.

In a further embodiment of a system for heating and frothing a beverage according to the invention the tubular wall of the froth wand has a thickness of between 0.4 and 0.6 mm, preferably a 0.5 mm wall thickness. It has appeared that a froth wand with such a relative small thickness can withstand the operational parameters during use and furthermore can be manufactured with relative low cost due to the relative low use of material.

When the froth wand is made of a material having a low thermal mass in a range of 1 to 20 gram, a used froth wand (i.e. a froth wand through which steam has passed) can be manually held at least for a time sufficient for disposing the froth wand. Preferably the length of the disposable froth wand is between 100 and 120 mm, in particular 110 mm.

In an embodiment of a system for heating and frothing a beverage according to the invention the froth wand comprises a blade at the steam outlet end. In this manner the froth wand can be efficiently used as a stirrer in the prepared beverage. The blade can be shaped either asymmetrical or symmetrical with regard to a longitudinal axis of the tubular wall. In order to facilitate stirring the froth wand can then comprise a grip at the steam inlet end. Such a grip can then be shaped either asymmetrical or symmetrical with regard to a longitudinal axis of the tubular wall.

In a particular embodiment of a system for heating and frothing a beverage according to the invention the froth wand comprises an upper flange at the steam inlet end. In this manner it is possible that a froth wand holder is used for holding the froth wand which is mechanically simple but still very reliable. It is then especially advantageous when the upper flange has a flat end face and/or when the froth wand comprises a retention flange spaced at a distance from the top flange. In addition, such flange(s) provide additional rigidity to the froth wand.

In a further embodiment of a system for heating and frothing a beverage according to the invention an outside diameter of the tubular wall increases from the steam outlet end towards the steam inlet end. Alternatively the tubular wall can comprise a portion extending from the steam inlet end, which portion has a decreasing outside diameter. With such froth wands it is possible to use froth wand holders for holding the froth wand which are mechanically simple but still very reliable.

In a still further embodiment of a system for heating and frothing a beverage according to the invention the tubular wall of the froth wand comprises an air opening, preferably an air slot extending parallel to a longitudinal axis of the tubular wall. In this manner a more consistent flow of steam through the steam channel can be obtained.

In an advantageous embodiment of a system for heating and frothing a beverage according to the invention the froth wand comprises a circulation channel provided on the tubular wall near the steam outlet end of the froth wand, said circulation channel having an intake opening and a separate outlet opening which latter is positioned adjacent the steam outlet, said circulation channel being preferably substantially parallel to the steam channel of the froth wand. In this manner a circulation of steam and milk in the circulation channel can be realized for more efficiently heating and frothing the beverage milk. The circulation channel can be formed by an addition tube arranged on the tubular wall near the steam outlet end of the froth wand or by a coaxial circulating sleeve forming the circulation channel between the inner wall of the circulating sleeve and the outer wall of the froth wand.

In an embodiment of a system for heating and frothing a beverage according to the invention wherein the froth wand holder is arranged for holding the froth wand in a substantially vertical position in the operational position the system can be configured in a rather compact manner having a small footprint. Preferably the froth wand holder is movably mounted in the device for heating and frothing a beverage for being displaced from the operational position to a froth wand insertion position, and vice versa. By using a moveable froth wand holder the system can be arranged to be used very safely. In a particular advantageous embodiment the froth wand holder is then rotatable or tiltable.

Although the system can be arranged for moving the froth wand holder automatically from the froth wand insertion position to the operational position the user of the system can receive a correct and immediate indication that the froth wand holder is in the operational position when the froth wand holder comprises a handle for manually displacing the froth wand holder. In this manner the safety of the system is further improved.

In a further embodiment of a system for heating and frothing a beverage according to the invention the froth wand holder comprises a horizontal seat for holding the froth wand. In this manner it is possible to construct the froth wand holder in a relative simple manner while till providing reproducible and correct holding of a froth wand. Inserting the froth wand in the froth wand holder can be realized in an easy manner when the horizontal seat comprises a froth wand opening for receiving a part of the froth wand. In case the horizontal seat comprises a radial slot opening into the froth wand opening the froth wand can be positioned in the froth wand opening from the side of the from wand holder.

In a still further embodiment of a system for heating and frothing a beverage according to the invention the froth wand holder comprises a clamping mechanism for clamping the froth wand. In this manner it is possible to prevent that the froth wand is removed from the froth wand holder unintentionally, e.g. during heating and frothing a beverage.

A reproducible and correct clamping of a froth wand in a froth wand holder can be realized in an embodiment of a system for heating and frothing a beverage according to the invention wherein the clamping mechanism comprises a movable engagement part, arranged for being displaced from an idle position at least partly protruding into the froth wand opening to an activating position outside the froth wand opening, said clamping mechanism further comprising a movable clamping part coupled to said displaceable engagement part, said movable clamping part being coupled to said displaceable engagement part such that the clamping part is positioned into a releasing position for releasing or receiving the froth wand when the engagement part is in the idle position and such that the clamping part is positioned in a clamping position for clamping the froth wand when the engagement part is in the activating position. Alternatively the device for heating and frothing a beverage can comprise a clamping activator, wherein the clamping mechanism comprises a movable clamping part, said movable clamping part being positioned in a releasing position for receiving or releasing the froth wand when the froth wand holder is in the froth wand insertion position, said clamping part cooperating with the clamping activator when the froth wand holder is in the operating position so at to be displaced into a clamping position for clamping the froth wand.

Although the froth wand can be removed from the froth wand holder when the holder is in the froth wand insertion position or a separate froth wand removal position, the safety of use of the system for heating and frothing a beverage according to the invention can be further improved when the froth wand holder comprises a froth wand ejector for ejecting the froth wand out of the froth wand holder. In this manner it is additionally clear for the user that heating and frothing a beverage is completed when the froth wand is ejected by the froth wand ejector. Preferably, the froth wand ejector is arranged for ejection the froth wand through the radial slot.

In an embodiment of a system for heating and frothing a beverage according to the invention a froth wand is ejected in a reliable and mechanically simple manner when the froth wand ejector comprises a spring actuated ejector arm, said spring being loaded when the froth wand holder is displaced from the froth wand insertion position into the operating position and released for actuating the ejector arm when the froth wand holder is displaced from the operating position into the froth wand insertion position.

In an advantageous embodiment of a system for heating and frothing a beverage according to the invention the froth wand holder comprises a lid which is mounted displaceable relative to the horizontal seat.

In a further embodiment of a system for heating and frothing a beverage according to the invention the steam conduit comprises an air inlet. In this manner a more consistent flow of steam through the steam channel can be obtained. Preferably the device for heating and frothing a beverage then comprises an air pump, in particular a diaphragm pump, connected to the air inlet via an active air inlet tube for introducing air into the flow of steam. To improve the consistency of the flow of steam the active air inlet tube comprises an air orifice.

In a still further embodiment of a system for heating and frothing a beverage according to the invention the steam conduit comprises a passive air inlet and the air pump is connected to an active air inlet, wherein the device for heating and frothing a beverage comprises a valve displaceable in a respective connection position for either connecting the steam conduit to the passive air inlet or the active air inlet. In this manner it is possible to select the introduction of air into the steam via the passive air inlet or the active air inlet, for example depending on the beverage to be prepared or the preference of the user.

In a particularly advantageous embodiment of a system for heating and frothing a beverage according to the invention the device for heating and frothing a beverage comprises a reservoir for cold water, preferably a separate reservoir for cold water, a cold water conduit and a cold water pump for supplying cold water to the steamer.

In an embodiment of a system for heating and frothing a beverage according to the invention the steam nozzle is movably mounted in the device for heating and frothing a beverage. It is then possible to provide an embodiment of a system for heating and frothing a beverage according to the invention wherein the steam nozzle is dimensioned to be received in the steam channel of the froth wand. In this manner the operation of the system can be relatively simple in that the froth wand can be positioned in the froth wand holder first and thereafter the steam nozzle can be moved into the steam channel for supplying steam into the steam channel. In order to improve the supply of steam into and through the steam channel of the froth wand the steam nozzle comprises a seal for sealing against an inner surface of the tubular wall enclosing the steam channel.

In a further embodiment of a system for heating and frothing a beverage according to the invention the device for heating and frothing a beverage additionally comprises a liquid coffee dispenser for dispensing liquid coffee as at least part of said beverage. In this manner the liquid coffee can e.g. be dispensed into a cup and the device for heating and frothing a beverage can be used to heat and froth the liquid coffee via the froth wand. Additionally, before, during or after the liquid coffee has been dispensed into the cup another beverage, such as for example milk, can be poured into the cup and the device for heating and frothing can be used to supply steam into the milk or coffee or milk/coffee mixture via the froth wand. Please note that the liquid coffee dispenser can comprise a water reservoir which preferably is additional to the cold water reservoir connected to the steamer.

In a preferred embodiment of a system for heating and frothing a beverage according to the invention the device for heating and frothing a beverage comprises a controller operationally connected to the steamer for controlling the operation of the steamer. This controller can be operationally connected to the air pump for controlling the operation of the air pump and/or operationally connected to the cold water pump for controlling the operation of the cold water pump and/or operationally connected to the valve for positioning the valve in a respective connecting position and/or operationally connected to the froth wand ejector for either activating or deactivating the froth wand ejector.

In a still further embodiment of a system for heating and frothing a beverage according to the invention the device for heating and frothing comprises a froth wand holder detector for detecting whether the froth wand holder is positioned in the operating position, said froth wand holder detector being operationally connected to the controller for supplying a signal to the controller indicative for whether the froth wand holder is positioned in the operating position or not, said controller being arranged for deactivating the froth wand ejector when the signal received from the froth wand holder detector indicates that the froth wand holder is in the operating position. In this manner the safety of use of the system can be improved further. Preferably, the froth wand holder detector is further arranged for detecting whether the froth wand holder is positioned in the froth wand insertion position, said froth wand holder detector being operationally connected to the controller for supplying a signal to the controller indicative for whether the froth wand holder is positioned in the froth wand insertion operating position or not, said controller being arranged for activating the froth wand ejector when the signal received from the froth wand holder detector indicates that the froth wand holder is in the froth wand insertion position and the controller has deactivated the steamer within a predetermined time period before receiving said signal from the froth wand holder detector. In this manner it is possible to discriminate the situation in which the froth wand is positioned in the froth wand holder before the steamer is activated and after the steamer has been activated, i.e. the beverage has been heated and frothed.

To improve safety of use even further the controller is arranged for automatically deactivating a component to which it is operationally connected when the signal from the froth wand holder detector indicates that the froth wand holder is in the froth wand insertion position. Preferably the controller is arranged for activating a component to which it is operationally connected only when the signal from the froth wand holder detector indicates that the froth wand holder is in the operating position.

In an embodiment of a system for heating and frothing a beverage according to the invention the device for heating and frothing a beverage includes a froth wand presence detector for detecting whether a froth wand is held in the froth wand holder, said froth wand presence detector being operationally connected to the controller for supplying thereto a froth wand presence signal indicative of whether or not a froth wand is held in the froth wand holder. In this manner it can be prevented that the system is activated in the situation that no froth wand is held by the froth wand holder even in case the froth wand holder is in the operational position. In addition it is then preferred when the controller is arranged for controlling the component which is operationally connected to it at least in dependence of the froth wand presence signal.

In an advantageous embodiment of a system for heating and frothing a beverage according to the invention the system for heating and frothing a beverage comprises a cup support for a cup, said froth wand holder and support being mutually arranged such that the froth wand held in the froth wand holder extends into a cup positioned on the support in the operational position of the froth wand holder. In this manner a user does not need to hold the cup himself or herself while the beverage is heated and frothed and can positioned the cup on the cup support. Preferably the support comprises position indicators indicating a central position of the cup in which central position the froth wand extends substantially centrally into the cup. Alternatively or additionally the support can comprise position indicators indicating a off centre position of the cup in which off centre position the froth wand extends substantially off centre into the cup. Such indicators can be formed by indentations or elevations or visual marks. In this manner the user can choose the position in the cup into which the froth wand extends and thus effect the manner in which the beverage is frothed.

In a further embodiment of a system for heating and frothing a beverage according to the invention the device for heating and frothing a beverage comprises a froth temperature sensor for sensing a temperature of froth in the cup, said temperature sensor being operationally connected to said controller for supplying thereto a signal indicative for the measured froth temperature. In this manner the controller can e.g. deactivate the steamer when the required or set temperature has been reached thereby using no more energy then required. It is then in particular advantageous when the froth temperature sensor comprises at least one microphone, which preferably is positioned above the cup, beside the cup above the upper edge of the cup or beside the cup below the upper edge of the cup.

In a still further embodiment of a system for heating and frothing a beverage according to the invention the froth wand comprises a fill indication mark. Such a fill indication mark can e.g. be a minimum fill level to ensure that a cup is filled with a sufficient amount so that the steam outlet extends to below the liquid level. Alternatively or additionally the fill indication mark can be a proposed fill indication, meaning that a beverage which is filled into a cup into which the froth wand extends up to the proposed fill indication mark can be heated and frothed in a generally accepted manner. Further an additional maximum fill indication mark can be provided which ensures that a beverage poured into a cup up to this maximum fill indication mark does not flow over the edge of the cup when the beverage is heated and frothed.

The invention further relates to a device for heating and frothing a beverage suitable for being used in a system for heating and frothing a beverage according to the invention, wherein said device for heating and frothing a beverage includes a steamer, a steam conduit connecting the steamer to a steam nozzle and a froth wand holder for removably holding a disposable froth wand, said froth wand holder being arranged for holding the disposable froth wand at least in an operational position in the device for heating and frothing a beverage. For redundancy reasons only the embodiments of a device for heating and frothing a beverage are described, the respective advantageous effects of the device for heating and frothing a beverage are not mentioned in the following in detail. However, reference is made to the before-mentioned, wherein all features mentioned as to be relevant or advantageous with regard to the system for heating and frothing a beverage are transferable to the device.

In an embodiment of a device for heating and frothing a beverage according to the invention the froth wand holder is arranged for holding a froth wand in a substantially vertical position in the operational position.

In a further embodiment of a device for heating and frothing a beverage according to the invention the froth wand holder is movably mounted in the device for heating and frothing a beverage for being displaced from the operational position to a froth wand insertion position, and vice versa. The froth wand holder is then preferably rotatable and preferably comprises a handle for manually displacing the froth wand holder.

In a still further embodiment of a device for heating and frothing a beverage according to the invention froth wand holder comprises a horizontal seat for holding a froth wand. The horizontal seat then preferably comprises a froth wand opening for receiving a part of a froth wand. It is further preferred that the horizontal seat comprises a radial slot opening into the froth wand opening.

In another embodiment of a device for heating and frothing a beverage according to the invention the froth wand holder comprises a clamping mechanism for clamping a froth wand. Preferably the clamping mechanism comprises a movable engagement part, arranged for being displaced from an idle position at least partly protruding into the froth wand opening to an activating position outside the froth wand opening, said clamping mechanism further comprising a movable clamping part coupled to said displaceable engagement part, said movable clamping part being coupled to said displaceable engagement part such that the clamping part is positioned into a releasing position for releasing or receiving a froth wand when the engagement part is in the idle position and such that the clamping part is positioned in a clamping position for clamping a froth wand when the engagement part is in the activating position.

In a still further embodiment of a device for heating and frothing a beverage according to the invention the device for heating and frothing a beverage comprises a clamping activator, wherein the clamping mechanism comprises a movable clamping part, said movable clamping part being positioned in a releasing position for receiving or releasing a froth wand when the froth wand holder is in the froth wand insertion position, said clamping part cooperating with the clamping activator when the froth wand holder is in the operating position so at to be displaced into a clamping position for clamping a froth wand.

In an advantageous embodiment of a device for heating and frothing a beverage according to the invention the froth wand holder van comprise a froth wand ejector for ejecting a froth wand out of the froth wand holder. The froth wand ejector is then preferably arranged for ejection a froth wand through the radial slot. The froth wand ejector can comprise a spring actuated ejector arm, said spring being loaded when the froth wand holder is displaced from the froth wand insertion position into the operating position and being released for actuating the ejector arm when the froth wand holder is displaced from the operating position into the froth wand insertion position.

In another favourable embodiment of a device for heating and frothing a beverage according to the invention the froth wand holder comprises a lid which is mounted displaceable relative to the horizontal seat.

In a further embodiment of a device for heating and frothing a beverage according to the invention the steam conduit comprises an air inlet. The device for heating and frothing a beverage can then comprise an air pump, in particular a diaphragm pump, connected to the air inlet via an active air inlet tube. The active air inlet tube preferably comprises an air orifice. In a still further embodiment of a device for heating and frothing a beverage according to the invention the steam conduit comprises a passive air inlet and the air pump is connected to an active air inlet, wherein the device for heating and frothing a beverage comprises a valve displaceable in a respective connection position for either connecting the steam conduit to the passive air inlet or the active air inlet.

In another embodiment of a device for heating and frothing a beverage according to the invention the device for heating and frothing a beverage comprises a reservoir for cold water, a cold water conduit and a cold water pump for supplying cold water to the steamer. The steam nozzle is preferably movably mounted in the device for heating and frothing a beverage. The steam nozzle can further comprise a seal for sealing against an inner surface of a tubular wall enclosing a steam channel of a froth wand.

In a still further embodiment of a device for heating and frothing a beverage according to the invention the device for heating and frothing a beverage comprises a liquid coffee dispenser for dispensing liquid coffee as at least part of said beverage.

The device for heating and frothing a beverage preferably comprises a controller operationally connected to the steamer for controlling the operation of the steamer. This controller can be operationally connected to the air pump for controlling the operation of the air pump and/or operationally connected to the cold water pump for controlling the operation of the cold water pump and/or operationally connected to the valve for positioning the valve in a respective connecting position and/or operationally connected to the froth wand ejector for either activating or deactivating the froth wand ejector. The device for heating and frothing then preferably comprises a froth wand holder detector for detecting whether the froth wand holder is positioned in the operating position, said froth wand holder detector being operationally connected to the controller for supplying a signal to the controller indicative for whether the froth wand holder is positioned in the operating position or not, said controller being arranged for deactivating the froth wand ejector when the signal received from the froth wand holder detector indicates that the froth wand holder is in the operating position.

In a still further embodiment of a device for heating and frothing a beverage according to the invention the froth wand holder detector is further arranged for detecting whether the froth wand holder is positioned in the froth wand insertion position, said froth wand holder detector being operationally connected to the controller for supplying a signal to the controller indicative for whether the froth wand holder is positioned in the froth wand insertion operating position or not, said controller being arranged for activating the froth wand ejector when the signal received from the froth wand holder detector indicates that the froth wand holder is in the froth wand insertion position and the controller has deactivated the steamer within a predetermined time period before receiving said signal from the froth wand holder detector.

In another embodiment of a device for heating and frothing a beverage according to the invention the controller is arranged for automatically deactivating a component to which it is operationally connected when the signal from the froth wand holder detector indicates that the froth wand holder is in the froth wand insertion position. The controller is in particular arranged for activating a component to which it is operationally connected only when the signal from the froth wand holder detector indicates that the froth wand holder is in the operating position.

In an even further embodiment of a device for heating and frothing a beverage according to the invention the device for heating and frothing a beverage includes a froth wand presence detector for detecting whether a froth wand is held in the froth wand holder, said froth wand presence detector being operationally connected to the controller for supplying thereto a froth wand presence signal indicative of whether or not a froth wand is held in the froth wand holder. The controller can then be arranged for controlling the component which is operationally connected to it at least in dependence of the froth wand presence signal.

In a further embodiment of a device for heating and frothing a beverage according to the invention the device for heating and frothing a beverage comprises a support for a cup, said froth wand holder and support being mutually arranged such that a froth wand held in the froth wand holder extends into a cup positioned on the support in the operational position of the froth wand holder. The support can then comprise position indicators indicating a central position of the cup in which central position a froth wand extends substantially centrally into a cup and/or position indicators indicating a off centre position of a cup in which off centre position a froth wand extends substantially off centre into the cup.

In a still further embodiment of a device for heating and frothing a beverage according to the invention the device for heating and frothing a beverage comprises a froth temperature sensor for sensing a temperature of froth in a cup, said temperature sensor being operationally connected to said controller for supplying thereto a signal indicative for the measured froth temperature. The froth temperature sensor can comprise at least one microphone.

The invention further relates to a froth wand suitable for being used in a system for heating and frothing a beverage according to the invention, wherein the froth wand is a disposable froth wand comprising a tubular wall having a steam inlet end comprising a steam inlet, a steam outlet end comprising a steam outlet separate from the steam inlet and a steam channel extending between the steam inlet and the steam outlet. For redundancy reasons only the embodiments of a froth wand are described, the respective advantageous effects of the froth wand are not mentioned in the following in detail. However, reference is made to the before-mentioned, wherein all features mentioned as to be relevant or advantageous with regard to the system for heating and frothing a beverage are transferable to the froth wand. The disposable froth wand is preferably made of biodegradable material.

In an embodiment of a froth wand according to the invention the steam outlet extends radially through the tubular wall. The steam outlet can be arranged at a free end of the froth wand extending in longitudinal direction. The steam outlet preferably is a circular opening having a diameter of between 1.0 mm and 2.0 mm. The steam outlet can comprise more outlet openings.

In a further embodiment of a froth wand according to the invention the froth wand comprises a porous element adjacent the steam outlet. The steam channel preferably has a diameter of between 4 mm and 10 mm, and the tubular wall of the froth wand can have a thickness of between 0.4 and 0.6 mm, preferably a 0.5 mm wall thickness.

In a still further embodiment of a froth wand according to the invention the froth wand is made of a material having a low thermal mass in a range of 1 to 20 gram. The length of the disposable froth wand can be between 100 and 120 mm, preferably 110 mm.

In another embodiment of a froth wand according to the invention the froth wand comprises a blade at the steam outlet end. The blade can be shaped asymmetrical or symmetrical with regard to a longitudinal axis of the tubular wall. Preferably the froth wand comprises a grip at the steam inlet end. The grip can be shaped asymmetrical or asymmetrical with regard to a longitudinal axis of the tubular wall.

In a still further embodiment of a froth wand according to the invention the froth wand comprises an upper flange at the steam inlet end. The upper flange then preferably has a flat end face. The froth wand can comprise a retention flange spaced at a distance from the top flange.

In an embodiment of a froth wand according to the invention, wherein an outside diameter of the tubular wall increases from the steam outlet end towards the steam inlet end. Alternatively the tubular wall can comprise a portion extending from the steam inlet end, which portion has a decreasing outside diameter.

In another embodiment of a froth wand according to the invention the tubular wall of the froth wand comprises an air opening, preferably an air slot extending parallel to a longitudinal axis of the tubular wall.

In an advantageous embodiment of a froth wand according to the invention the froth wand comprises a circulation channel provided on the tubular wall near the steam outlet end of the froth wand, said circulation channel having an intake opening and a separate outlet opening which latter is positioned adjacent the steam outlet, said circulation channel being preferably substantially parallel to the steam channel of the froth wand. In this manner a circulation of steam and milk in the circulation channel can be realized for more efficiently heating and frothing the beverage milk. The circulation channel can be formed by an addition tube arranged on the tubular wall near the steam outlet end of the froth wand or by a coaxial circulating sleeve forming the circulation channel between the inner wall of the circulating sleeve and the outer wall of the froth wand.

In a specific embodiment of a froth wand according to the invention the froth wand comprises a fill indication mark.

The invention still further relates to a method of preparing a beverage using a system for heating and frothing a beverage according to the invention, wherein the method comprises the step of positioning a froth wand in the froth wand holder of the device for heating and frothing a beverage such that the froth wand is held in the froth wand holder in a substantially vertical position, the step of activating the device for heating and frothing a beverage when the froth wand holder is in the operational position in the device for heating and frothing a beverage in which operational position the steam nozzle is in communication with the steam inlet of the froth wand, the step of supplying steam to and through the froth wand, the step of releasing the froth wand from the froth wand holder after steam has passed a predetermined number of times through the froth wand and the step of disposing the froth wand. By disposing the froth wand after steam has passed a predetermined number of times through the froth wand the method of preparing a beverage can be performed in a hygienic manner.

Preferably the predetermined number of times is less than five. Most preferred the predetermined number of times is one, which means that the froth wand is only used once improving the hygienic use even further. For redundancy reasons only the embodiments of a method for preparing a beverage are described, the respective advantageous effects of the method are not mentioned in the following in detail. However, reference is made to the before-mentioned, wherein all features mentioned as to be relevant or advantageous with regard to the system for heating and frothing a beverage are transferable to the method.

In an embodiment of a method for preparing a beverage according to the invention the step of supplying steam is enabled only after the froth wand is held in the froth wand holder.

In a further embodiment of a method of preparing a beverage according to the invention the step of positioning a froth wand in the froth wand holder of the device for heating and frothing a beverage is performed when the froth wand holder is positioned in the froth wand insertion position and the method further comprises the step of displacing the froth wand holder from the froth wand insertion position to the operational position and the step of displacing the froth wand holder from the operational position to the froth wand insertion position after the step of supplying steam to and through the froth wand and before the step of releasing the froth wand from the froth wand holder. The steps of displacing the froth wand holder from the froth wand insertion position to the operational position and vice versa then can include the step of rotating the froth wand holder.

In another embodiment of a method of preparing a beverage according to the invention the method further comprises the step of clamping the froth wand at least in the operational position of the froth wand holder. Preferably the step of clamping the froth wand takes place automatically when the froth wand holder is displaced from the froth wand insertion position to the operational position, in this manner the safety of use of the method is further improved.

In a still further embodiment of a method of preparing a beverage according to the invention the method can comprise the step of disabling supplying steam when the froth wand holder is in the froth wand insertion position. Alternatively or additionally supplying steam is enabled only when the froth wand holder is in the operational position.

In an advantageous embodiment of a method for preparing a beverage according to the invention the step of releasing the froth wand from the froth wand holder is performed by the froth wand ejector.

The method can further comprise the step of closing the lid when the froth wand has been positioned in the opening of the froth wand support and supplying steam can be enabled only after the lid has been closed. The step of releasing the froth wand from the froth wand holder can then be performed automatically by displacing the lid away from the froth wand support.

In a still further embodiment of a method for preparing a beverage according to the invention during the step of supplying steam to and through the froth wand air is sucked into the steam. It is then preferred when during the step of supplying steam to and through the froth wand air is pumped into the steam. The step of supplying steam can comprise the step of supplying cold water to the steamer.

In a preferred embodiment of a method for preparing a beverage according to the invention the method comprises the step of displacing the steam nozzle into the steam inlet of the froth wand when the froth wand is held in the froth wand holder before the step supplying steam to and through the froth wand.

In another embodiment of a method for preparing a beverage according to the invention the method can comprise the step of detecting whether or not a froth wand is held in the froth wand holder.

A beverage can be prepared relatively easy in an embodiment of a method for preparing a beverage according to the invention in which the method comprises the step of placing a cup below the froth wand holder before a froth wand is positioned in the froth wand holder. The method then preferably comprises the step of filling the cup with a first beverage, such as milk. During the step of filling the cup with a first beverage the cup can be filled up to the fill indication mark, such that the steam outlet of the froth wand extends into the first beverage.

In an advantageous embodiment of a method for preparing a beverage according to the invention the method comprises the step of using a froth wand with a circulation channel provided on the tubular wall near the steam outlet end of the froth wand, said circulation channel having an intake opening and a separate outlet opening which latter is positioned adjacent the steam outlet, said circulation channel being preferably substantially parallel to the steam channel of the froth wand, the method further comprises the step of positioning the circulation channel in the beverage such as to realize circulation of the beverage in the circulation channel. In this manner a more efficient heating and frothing the beverage milk can be obtained.

A versatile method for preparing a beverage according to the invention can be obtained in case the method comprises the step adding a second beverage into the cup after steam has been passed through the froth wand into the first beverage. The method then preferably comprises the step adding a second beverage into the cup before, during or after steam has been passed through the froth wand into the first beverage. In particular the second beverage is coffee and the first beverage is milk.

In a further embodiment of a method for preparing a beverage according to the invention the method comprises the step of using the froth wand as stirrer after the froth wand has been released.

An embodiment of a method for preparing a beverage preferably comprises the step of positioning the cup such that the froth wand extends substantially centrally or off center into the cup.

A further embodiment of a method for preparing a beverage according to the invention comprises the step of measuring the temperature of the froth in the cup. The step of measuring the temperature of the froth then preferably comprises the step of recording sound from the froth and the step of deriving the temperature from the recorded sound.

DESCRIPTION OF THE DRAWINGS

Further features and advantages of the present invention will appear from reading the description which follows, provided by way of non-limiting example and with reference to the accompanying drawings, in which:

In FIG. 1 an embodiment of a system 1 for heating and frothing according to the invention is schematically shown in front view partly broken away. The system 1 comprises a device 2 for heating and frothing a beverage and a froth wand 3.

Figure 1:
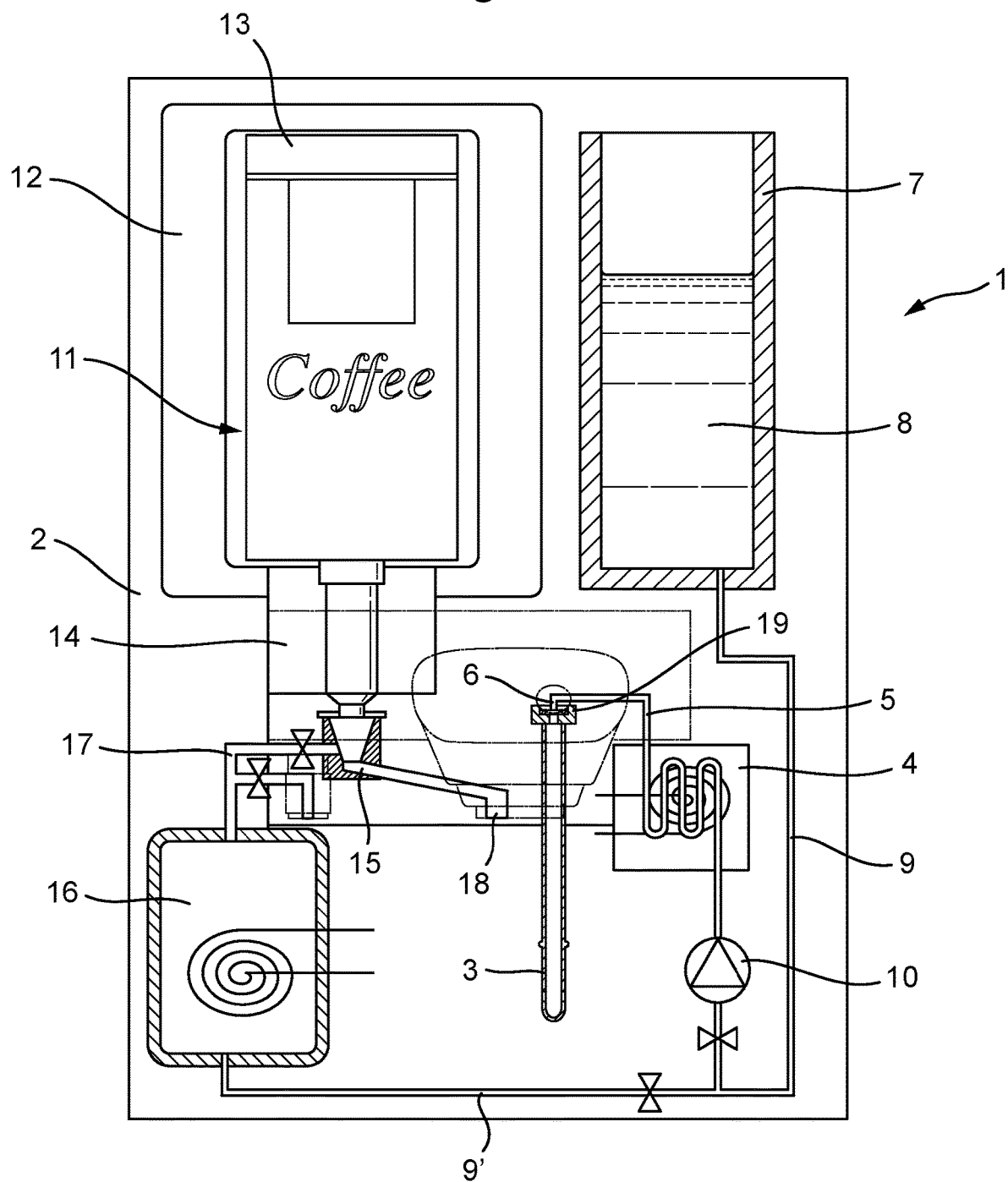
FIG. 1 schematically shows an embodiment of a system for heating and frothing according to the invention in front view partly broken away.

The device 2 includes a steamer 4, for example a thermoblock, a steam conduit 5 connecting the steamer 4 to a steam nozzle 6. A reservoir 7 for cold water 8 is provided in the device 2, which cold water reservoir 7 is connected to the steamer 4 via a cold water conduit 9 and a cold water pump 10 for supplying cold water to the steamer 4.

DETAILED DESCRIPTION

In the embodiment shown in FIG. 1 the device 2 further comprises a liquid coffee dispenser 11 for dispensing liquid coffee. In the shown embodiment the liquid coffee dispenser 11 comprises a chamber 12 for receiving a package 13 of concentrated liquid coffee. The liquid coffee dispenser 11 further comprises a coffee dosing apparatus 14 for dosing an amount of concentrated liquid coffee into a mixing chamber 15. Heated water is supplied from a water heater 16 via a water conduit 17 to the mixing chamber 15 to dilute the concentrated liquid coffee to a liquid coffee having a more consumable concentration. This liquid coffee can be dispensed into a cup (not shown in FIG. 1) from a liquid coffee outlet 18. In the shown embodiment the water heater 16 is supplied with cold water from the cold water reservoir 7 by means of the cold water conduit 9 and an extension 9' thereof. In other embodiments the water heater 16 can be supplied with water from a water source separate from the cold water reservoir 7.

Figure 2:
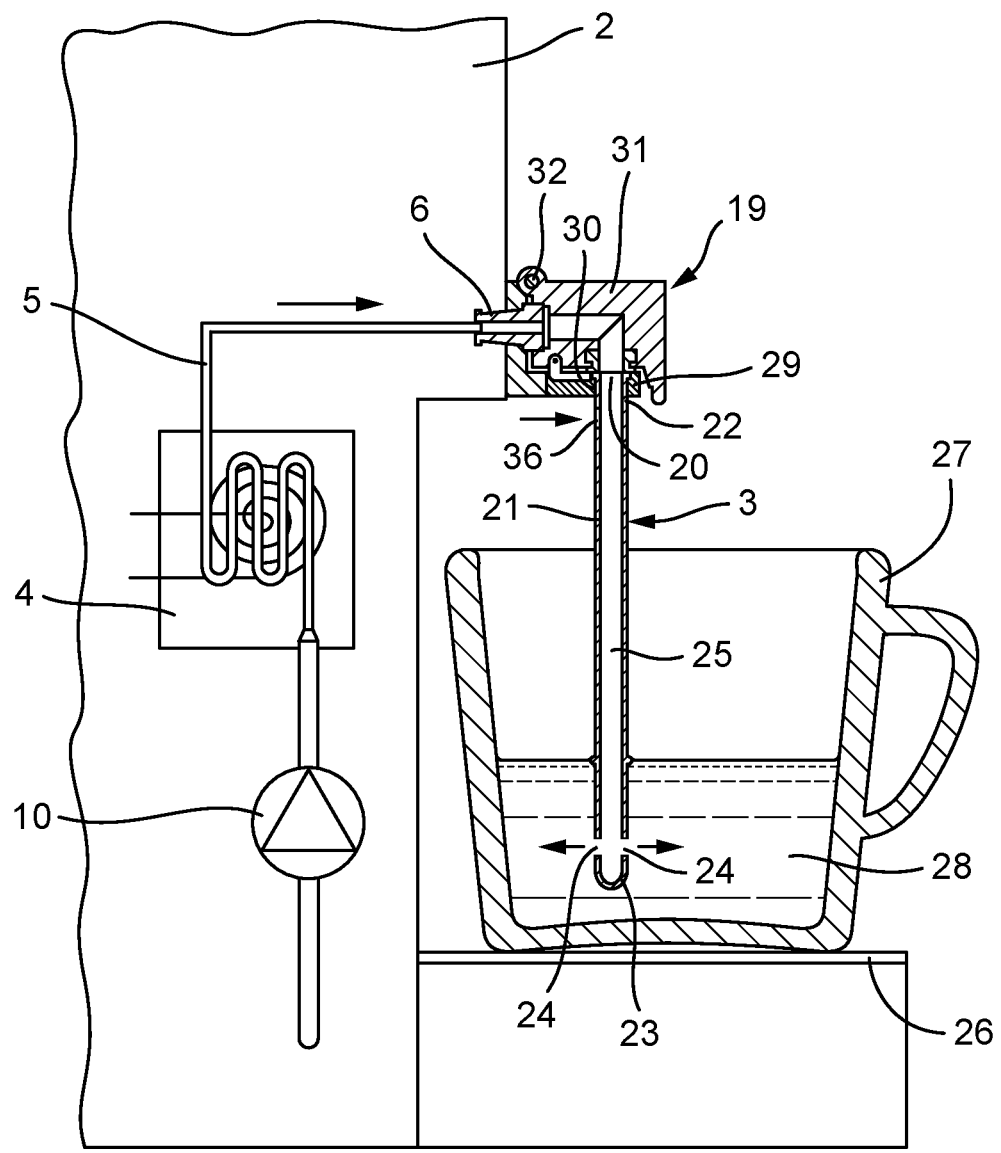
FIG. 2 schematically shows a part of the embodiment of FIG. 1 in side view with a cup placed on a cup support.

The device 2 further comprises a froth wand holder 19 for removably holding the froth wand 3. The froth wand holder 19 is arranged for holding the froth wand 3 at least in an operational position (as shown in FIG. 2) in the device 2 in which the steam nozzle 6 is in communication with a steam inlet 20 of the disposable froth wand 3. The froth wand holder 19 comprises a horizontal seat 29 for holding the froth wand 3. For this the horizontal seat 29 has a froth wand opening 30 for receiving a part of the froth wand 3. The froth wand holder 19 further comprises a lid 31 which is mounted displaceable relative to the horizontal seat 29, in the shown embodiment the lid 31 is mounted on a rotation shaft 32 so that it can be rotated away from the seat 29 so that a froth wand 3 can be placed in the froth wand opening 30 or taken out therefrom (the so called froth wand insertion position of the froth wand holder 19) or rotated towards the seat 29 to enclose a froth wand 3 positioned in the froth wand holder 19 which is then situated in the operational position.

The froth wand 3 is a disposable froth wand comprising a tubular wall 21 having a thickness of between 0.4 and 0.6 mm, preferably a 0.5 mm wall thickness, and having a steam inlet end 22 comprising the steam inlet 20, a steam outlet end 23 comprising at least one steam outlet 24 separate from the steam inlet 20 and a steam channel 25 having a diameter of between 4 mm and 10 mm extending between the steam inlet 20 and the steam outlet 24. In the embodiment shown in FIG. 2 the steam outlet 24 extends radially through the tubular wall 21. Furthermore the tubular wall 21 of the froth wand 3 comprises an air opening 36 extending through the wall. In the shown embodiment the air opening is slot shaped, the slot extending parallel to a longitudinal axis of the tubular wall 21. In other embodiments the air opening can be formed by one or more round holes.

The disposable froth wand 3 is made of biodegradable material, in particular a material having a low thermal mass in a range of 1 to 20 gram.

In FIG. 2 it is further shown that the system 1, in particular the device 2, comprises a support 26 for a cup 27, and that the froth wand holder 19 and the support 26 are mutually arranged such that the froth wand 3 held in the froth wand holder 19 extends into the cup 27 positioned on the support 26 in the operational position of the froth wand holder. Indicated in FIG. 2 is further an amount of milk 28, as first beverage while the liquid coffee is also called second beverage in this description, and that the disposable froth wand 3 has a length between 100 and 120 mm, preferably 110 mm, such that the steam outlet 24 is positioned below the milk meniscus.

Referring to FIGS. 3A-3L a method of preparing a beverage by heating and frothing using the system 1 of FIGS. 1 and 2 will be described in the following.

Figure 3A:
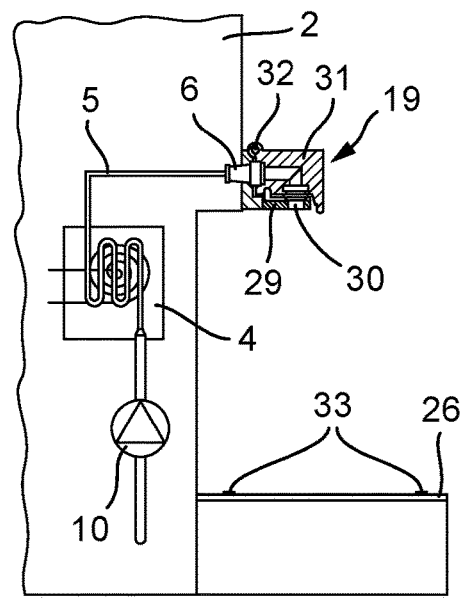
FIGS. 3A, 3B, 3C, 3D, 3E, 3F, 3G, 3H, 3I, 3J, 3K, and 3L schematically show the steps of a method of preparing a beverage by heating and frothing a beverage using the system of FIGS. 1 and 2.
Figure 3B:
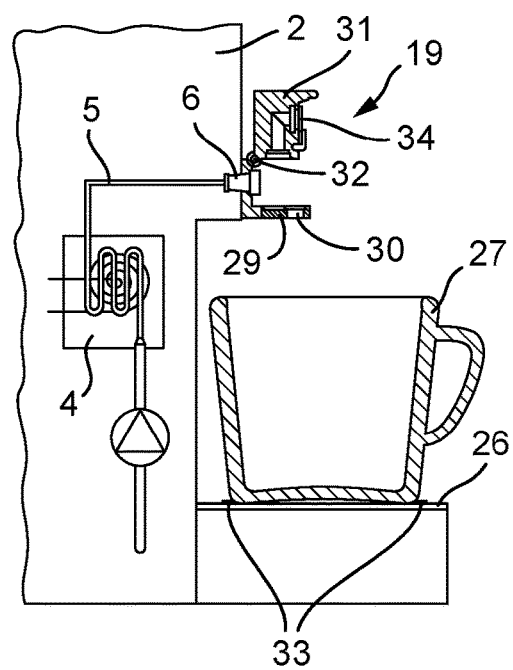
Figure 3C:
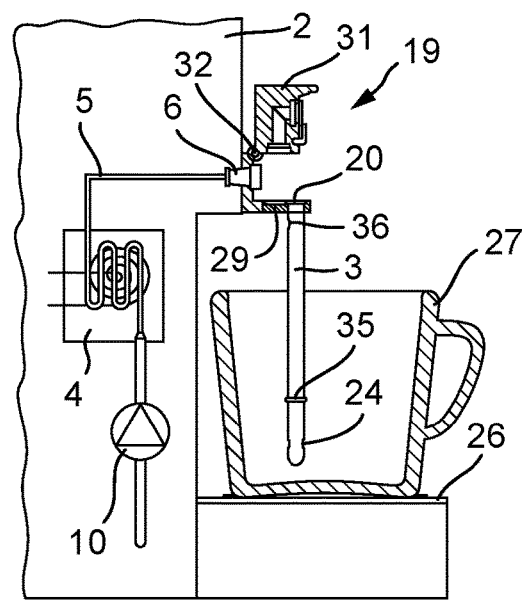
Figure 3D:
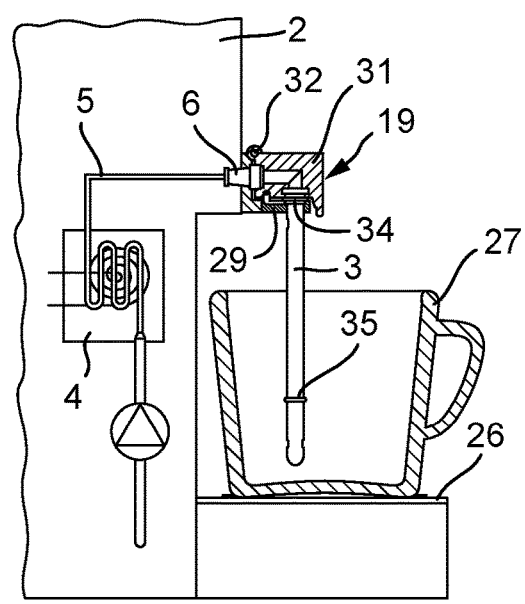
Figure 3E:
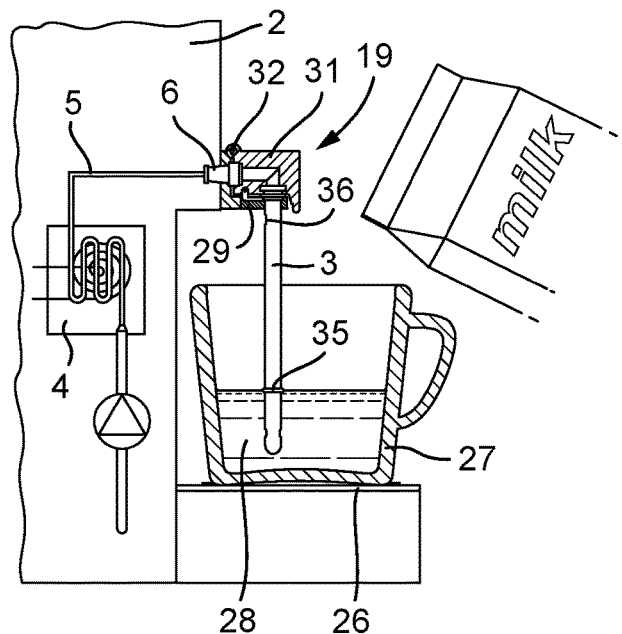

In FIG. 3A the start or rest position of the device 2 is shown in which the lid 31 is closed. To shorten the time period in which the beverage can be prepared the steamer or thermo block 4 is kept operative such that the water used for forming the steam is kept at an idle temperature of about 90° C. In the first step shown in FIG. 3B the lid 31 is opened by rotation around the rotation shaft 32 placing the froth wand holder 19 in the so-called froth wand insertion position, and a cup 27 is placed on the support 26. The system is arranged such that in this froth wand insertion position supply of steam is disabled. In order to provide a user with information where to place the cup 27 the support comprises position indicators 33, such as e.g. visual markings, indicating a central or off center position of the cup. A central position means that when a froth wand is held in the froth wand holder 19 the froth wand extends substantially centrally into the cup, in the off center position the froth wand will extend off center into the cup. In the second step shown in FIG. 3C a froth wand 3 is placed in the froth wand opening 30 of the froth wand holder 19 of the device 2 such that the froth wand 3 is held in the froth wand holder 19 in a substantially vertical position. In addition, in this so called operational position the steam nozzle 6 is in communication with the steam inlet 20 of the froth wand 3. In the third step shown in FIG. 3D the lid 31 is closed. The lid 31 comprises sealing means 34 which provides a seal with the upper edge of the froth wand 3 and in addition provides clamping of the froth wand 3. Please note that the system is arranged such that supplying steam is enabled only after the froth wand 3 is positioned in the froth wand holder 19 and more preferably when the lid 31 has been closed. In the fourth step shown in FIG. 3E the cup 27 is filled with a first beverage, such as milk 28, up to a fill indication mark 35 provided on the froth wand 3, such that the steam outlet 24 of the froth wand 3 extends into the milk 28.

Figure 3F:
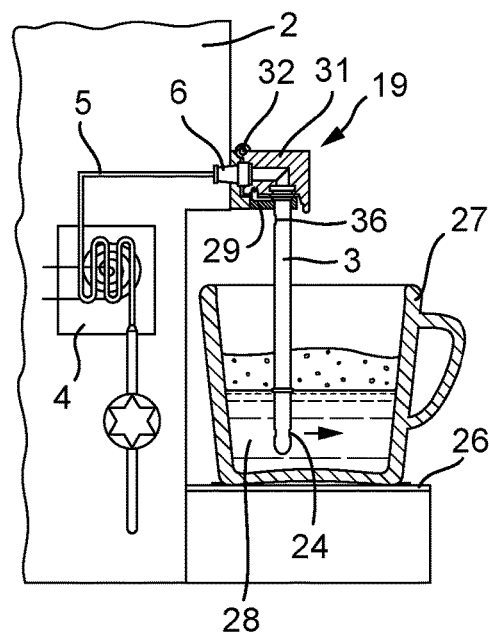
Figure 3G:
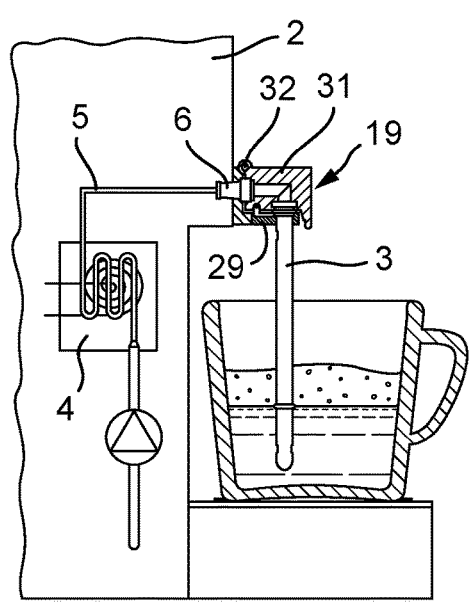
Figure 3H:
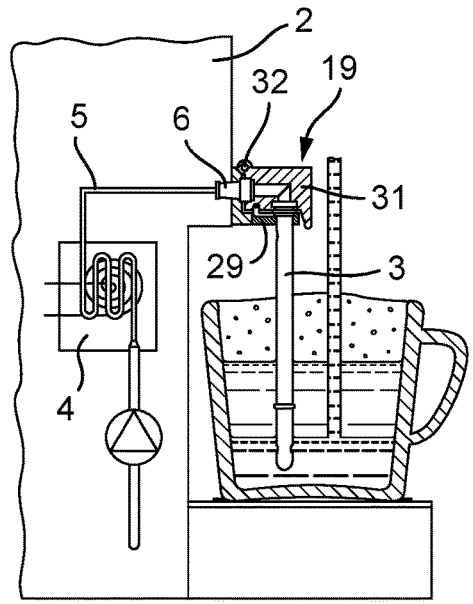
Figure 3I:
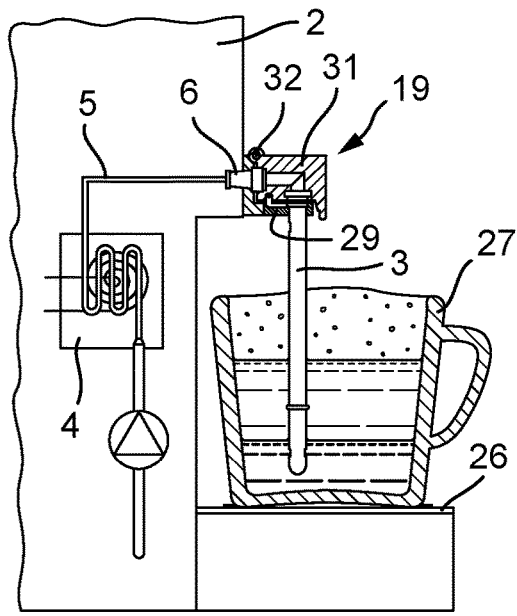
Figure 3J:
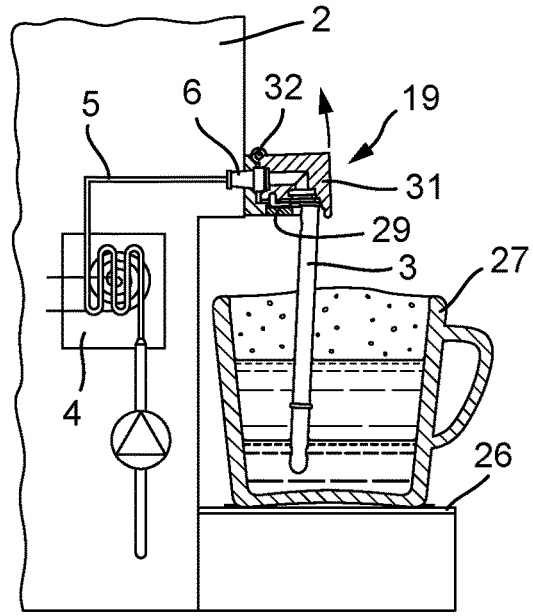

In the fifth step as shown in FIG. 3F the steamer 4 is activated and warms up the water further to produce steam which is then supplied to and through the froth wand 3 and into the milk 28 via the steam outlet 24. During steam supply cold water is fed from the cold water reservoir 7 (FIG. 1) to the steamer 4. During this supply of steam to and through the froth wand 3 air is sucked into the steam via the air slot 36. Supply of steam realizes the heating and frothing of the milk 28 and takes in this embodiment place during a predetermined period of time to sufficiently heat and froth the milk 28. After the time period has elapsed the steamer 4 is deactivated in the sixth step as shown in FIG. 3G. Then in the seventh step (FIG. 3H) the liquid coffee dispenser 11 is activated and coffee as a second beverage different from the first beverage is added into the cup 27 until the dosing of coffee is completed (FIG. 3I). If desired by the user the steamer 4 can be activated again to heat and froth the coffee/milk mixture. Please note that in other embodiments the coffee can be dispensed into the cup and optionally heated and frothed before the milk is poured into the cup 27 and heated and frothed.

Figure 3K:
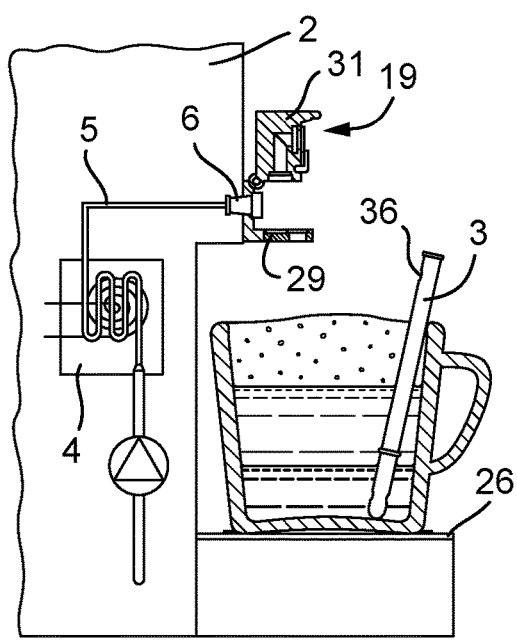
Figure 3L:
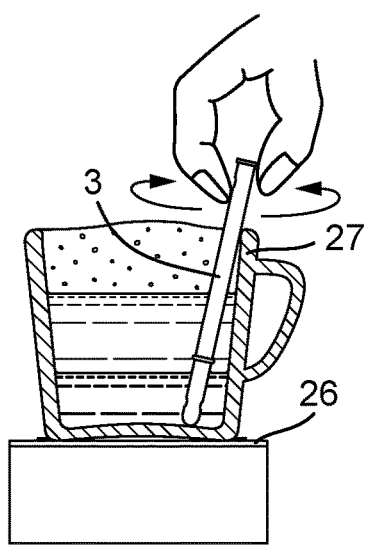

In the following step the lid 31 is opened (indicated by the arrow in FIG. 3J) and finally reaches the froth wand insertion position, thereby releasing the froth wand 3 from the froth wand holder 19. Which in the shown embodiment can be manually taken out of the froth wand holder 19 as shown in FIG. 3K. If desired the froth wand 3 can be used as stirrer (FIG. 3L) after the froth wand 3 has been released and the user can consume the prepared beverage and thereafter dispose of the froth wand 3.

In the embodiment shown in FIG. 3 the froth wand 3 is disposed when it is used only once. Amongst others things dependent on the frequency the system is used to heat and froth a beverage the froth wand 3 can be used more than once but from a hygienic point of view number of times a froth wand is used should preferably be less than five.

Figure 4A:
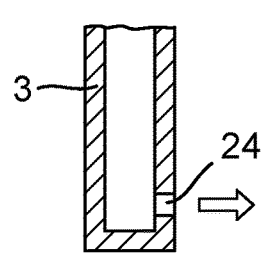
FIGS. 4A, 4B, 4C, 4D, 4E, 4F, and 4G schematically show a disposable froth wand according to the invention with a radially extending steam outlet, with the froth wand shown in several positions in a cup.
Figure 4B:
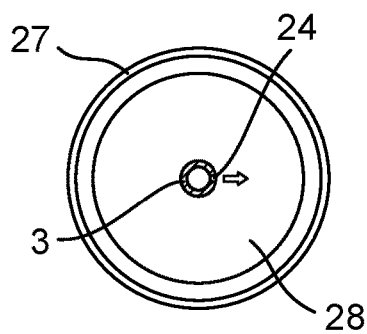
Figure 4C:
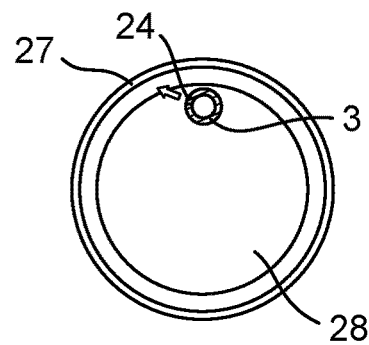
Figure 4D:
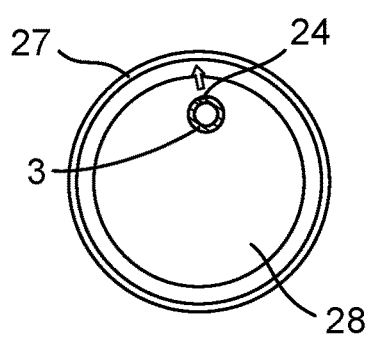
Figure 4E:
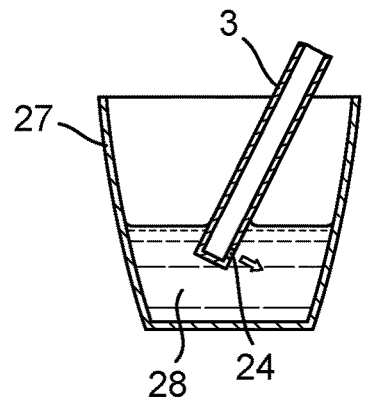
Figure 4F:
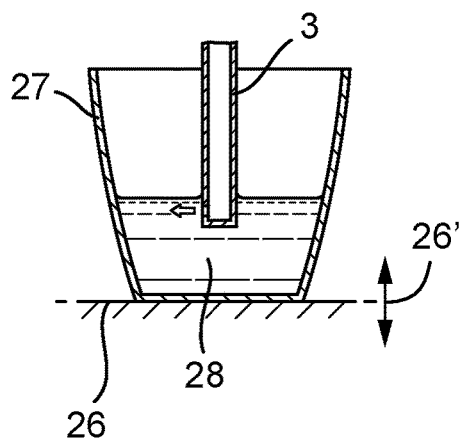
Figure 4G:
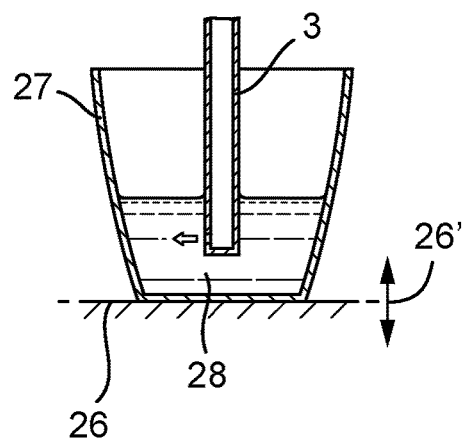

In FIGS. 4A-4G schematically the disposable froth wand 3 with the radially extending steam outlet 24 of FIG. 3 is shown, with the froth wand shown in several positions in which it can be positioned relative to the cup 27. The steam outlet 24 has a diameter of 1.5 mm, but can in other embodiments be between 1.0 mm and 2.0 mm. In FIG. 4B the central position of the froth wand 3 in the cup is indicated, while in FIGS. 4C and 4D the off center position of the froth wand 3 relative to the cup 27 is indicated. The radial extending slot 24 extends somewhat tangentially to the cup wall as indicated in FIG. 4C and is directed to the wall as indicated in FIG. 4D. In a not shown position the radial slot 24 can be directed to the center of the cup when the froth wand 3 is positioned off center. Please note that the user can to some extent influence frothing by adjusting the direction of the steam outlet and thereby adjust the frothing to his or her desires. In case the support 26 is adjustable in height (as indicated by the arrow 26') in FIGS. 4F and 4G the user can to some extent influence frothing by adjusting the height of the support and thus the depth in the milk the froth wand, in particular the steam outlet 24, is submerged, and thereby adjust the frothing to his or her desires. In addition the system 1 can be provided with several supports each having their own thickness to adjust the submersion depth of the froth wand 3 in the milk. In addition, the froth wand 3 can be tilted somewhat from the vertical position as shown in FIG. 4E to direct the steam downwards into the milk. Please note that it is also possible to realize this downwards direction of steam by tilting the cup.

Figure 5A:
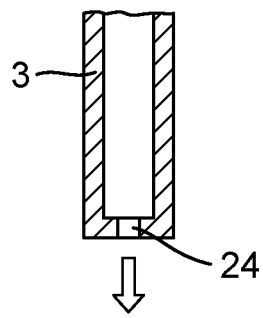
FIGS. 5A, 5B, 5C, 5D, 5E, and 5F schematically show a disposable froth wand according to the invention with a longitudinally extending steam outlet, with the froth wand shown in several positions in a cup.
Figure 5B:
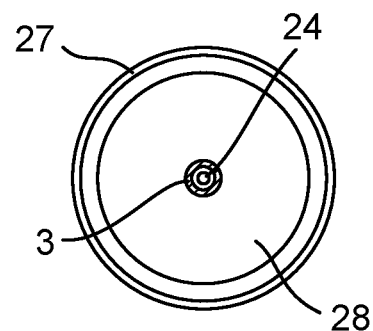
Figure 5C:
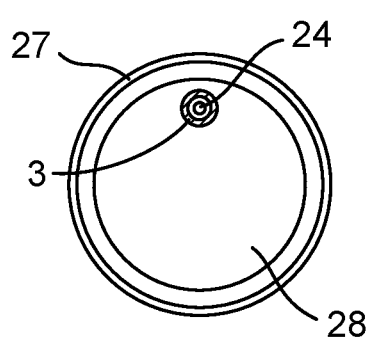
Figure 5D:
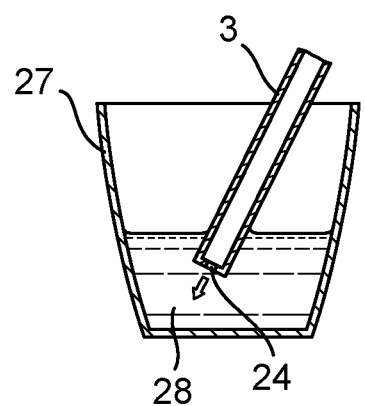
Figure 5E:
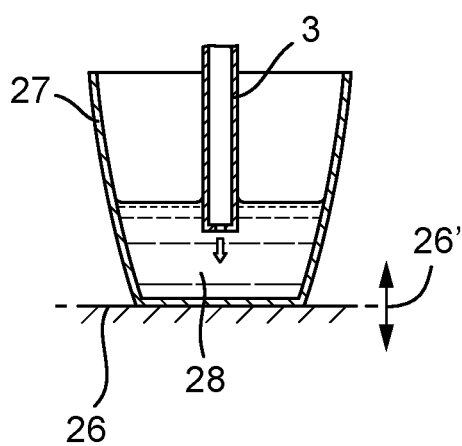
Figure 5F:
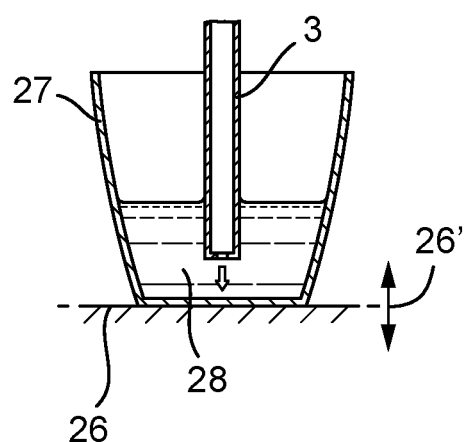

In FIGS. 5A-5F schematically another embodiment of a disposable froth wand 3 is shown comprising a longitudinally extending steam outlet 24, in this embodiment having a diameter of 1.5 mm, but the diameter can in other embodiments be between 1.0 mm and 2.0 mm, with the froth wand 3 shown in several positions in which it can be positioned relative to the cup 27. In FIG. 5B the central position of the froth wand 3 in the cup is indicated, while in FIG. 5C the off center position of the froth wand 3 relative to the cup 27 is indicated. In case the support 26 is adjustable in height (as indicated by the arrow 26') in FIGS. 5E and 5F the user can to some extent influence frothing by adjusting the height of the support and thus the depth in the milk the froth wand, in particular the steam outlet 24, is submerged, and thereby adjust the frothing to his or her desires. In addition the system 1 can be provided with several supports each having their own thickness to adjust the submersion depth of the froth wand 3 in the milk. In addition, the froth wand 3 can be tilted somewhat from the vertical position as shown in FIG. 5D to direct the steam downwards into the milk. Please note that it is also possible to realize this downwards direction of steam by tilting the cup.

In the embodiment shown in FIG. 3 air is introduced into the steam via the air inlet 36 of the froth wand 3 to provide a more consistent flow of steam. However, in other embodiments air can already be introduced in the steam in the device 2 as will be shown in FIGS. 6 to 8. Please note that for convenience of drawing steam nozzle has been left out in these figures and thus the steam conduit 5 is shown as directly engaging the froth wand 3. It will be clear however that it is the steam nozzle that engages the froth wand.

Figure 7:
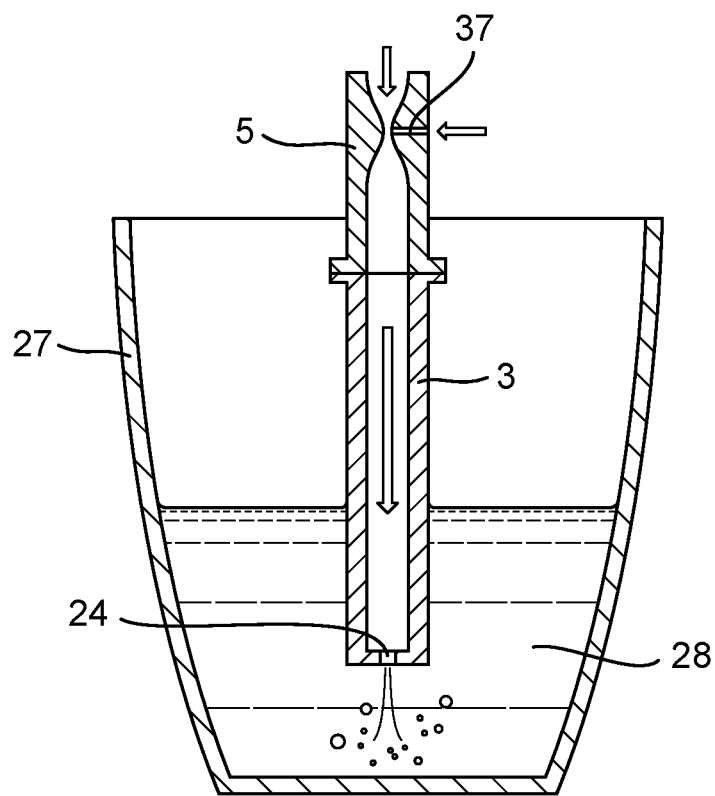
FIG. 7 schematically shows an embodiment of a system according to the invention in which the device for heating and frothing a beverage comprises a steam conduit with a passive air inlet for introducing air into the steam conduit.

In FIG. 7 the steam conduit 5 can provided with a (passive) air inlet 37, e.g. formed by a venture, a hole or a slot in the steam conduit 5, so that air can be sucked into the steam conduit 5 when steam is being passed therethrough.

Figure 6:
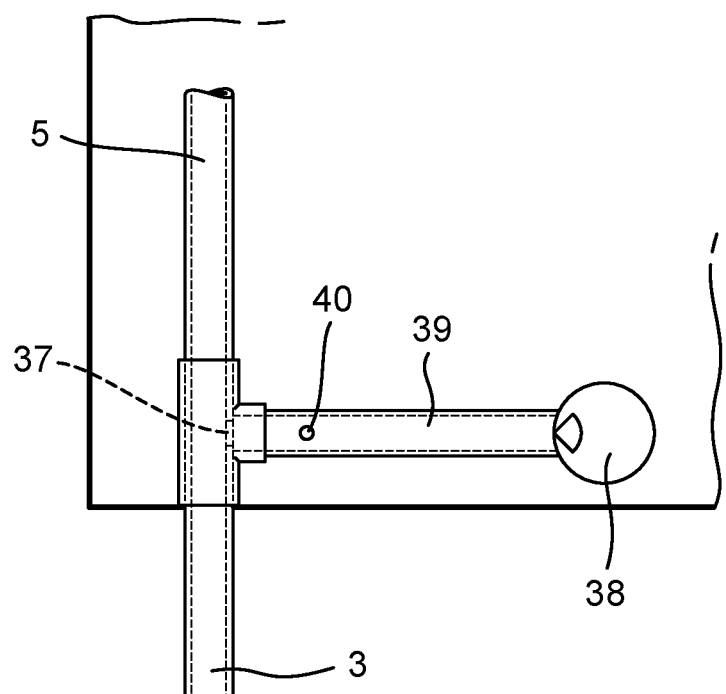
FIG. 6 schematically shows an embodiment of a system according to the invention in which the device for heating and frothing a beverage comprises an active air inlet tube and an air pump for introducing air into the steam conduit.

In the embodiment shown in FIG. 6 the device comprises an air pump 38 (such as a diaphragm pump) connected to the air inlet 37 via an active air inlet tube 39, comprising an air orifice 40. In this manner air can be actively pumped into the steam via the steam inlet 37.

Figure 8A:
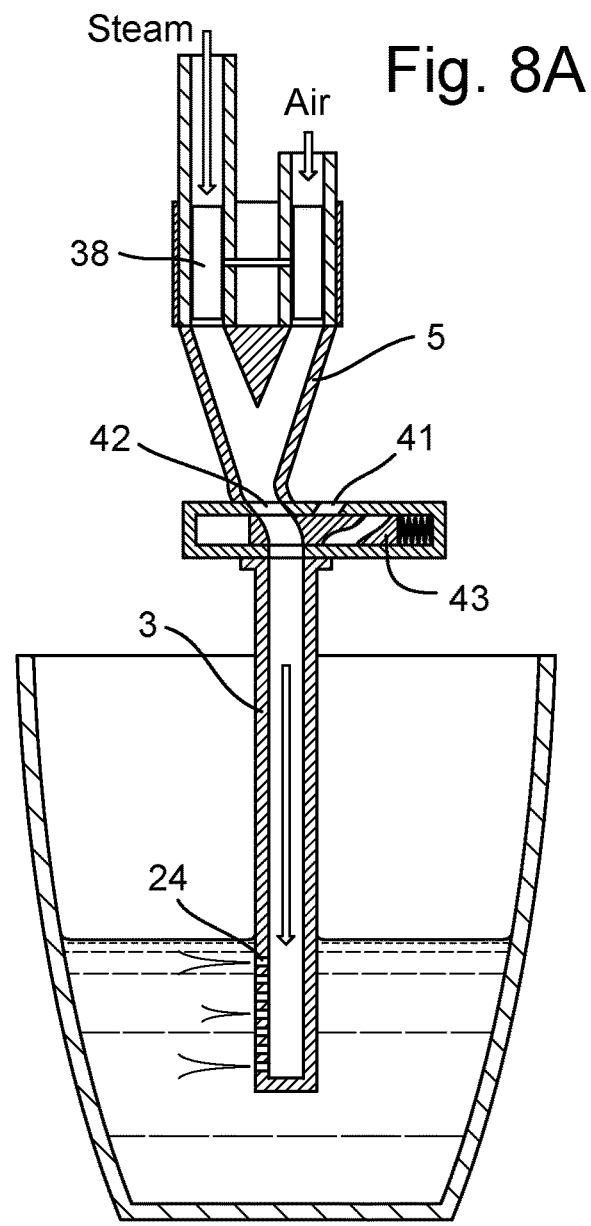
FIGS. 8A, 8B, and 8C schematically show an embodiment of a system according to the invention in which the device for heating and frothing a beverage comprises a valve displaceable in a respective connection position for either connecting the steam conduit to a passive air inlet or an active air inlet for introducing air into the steam conduit.
Figure 8B:
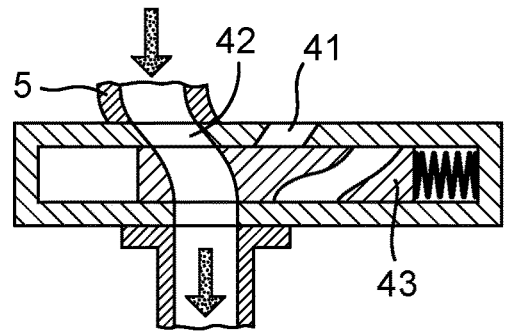
Figure 8C:
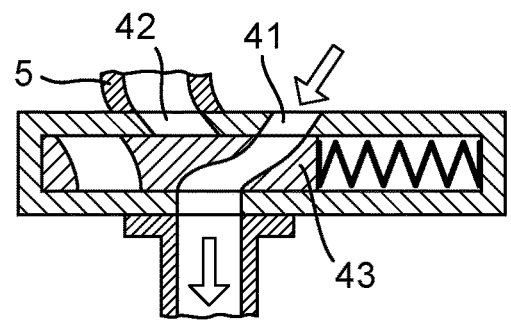

In the embodiment shown in FIGS. 8A-C the steam conduit 5 may comprises a passive air inlet 41 as well as an air pump 38 connected to an active air inlet 42, and a valve 43 displaceable in a respective connection position for either connecting the steam conduit 5 to the passive air inlet 41 (FIG. 8C) or the active air inlet 42 (FIG. 8B).

In the embodiment shown in FIG. 3 air is introduced into the steam via the air inlet 36 of the froth wand 3 to provide a more consistent flow of steam which is dispensed into the milk by a radially extending steam outlet 24. In FIG. 5 an alternative froth wand 3 is indicated comprising a longitudinally extending steam outlet, and in FIG. 9A this froth wand 3 is shown with the air slot. In FIGS. 9A-9G and 13A-13C schematically several embodiments of a froth wand are shown which can be used.

Figure 9A:
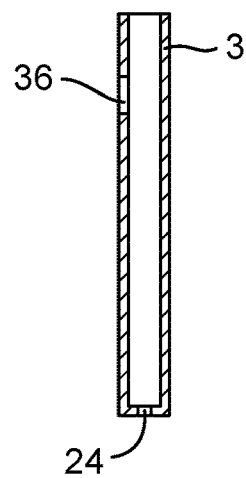
FIGS. 9A, 9B, 9C, 9D, 9E, 9F, and 9G schematically show several embodiments of a froth wand according to the invention.
Figure 9B:
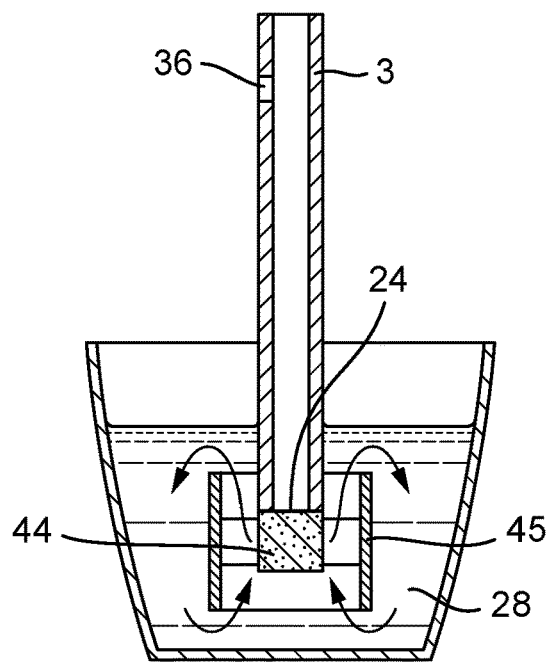

In the embodiment shown in FIG. 9B the froth wand 3 comprises a porous element 44 adjacent the steam outlet 24 and in the shown embodiment with a coaxial circulating sleeve 45 forming a circulation channel (as shown preferably substantially parallel to the steam channel of the froth wand) between the inner wall of the sleeve 45 and the outer wall of the froth wand 3 for realizing a circulation of steam and milk in the circulation channel as indicated by the arrows for more efficiently heating and frothing the beverage milk. Please note that since the circulating sleeve 45 is provided at the end of the froth wand 3 it can be easily submerged into to milk for obtaining a circulation during operation. The circulating sleeve 45 can of course also be used in embodiment without the porous element 44. Air is introduced in the steam by the air slot 36 in the froth wand 3, but can alternatively or additionally be introduced in the steam conduit of the device.

Figure 9C:
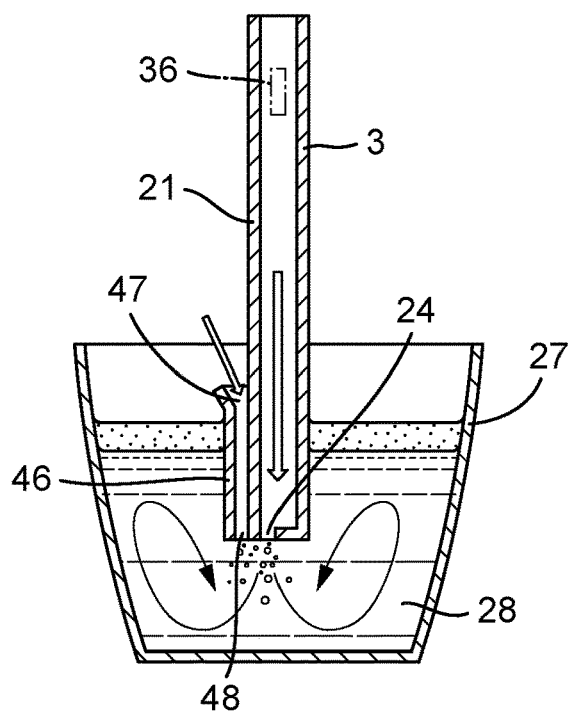

In the embodiment shown in FIG. 9C an air addition tube 46 is arranged on the tubular wall 21 near the steam outlet end 24 of the froth wand 3. The air addition tube 46 has an air intake opening 47 and an air outlet opening 48 separate from the steam outlet 24 but positioned adjacent to the steam outlet 24. In one embodiment of the invention during filling the cup with milk 28 care should be taken that the liquid level should not rise above the air intake opening 47 of the air addition tube 46. This air addition tube 46 can be used in place of the air slot 36 for introducing air into the milk 28. In another embodiment however, this air addition tube 46 can be used additional to the air slot 36 (indicated in phantom in FIG. 9C) for either introducing additional air into the milk 28 or when the intake opening 47 is positioned below the level of milk or during use comes when the level of milk rises above the intake opening 47 to realize circulation of steam and milk in the circulation channel formed between the inner wall of the tube 46 and the outer wall of the froth wand 3 as indicated by the arrows for more efficiently heating and frothing the beverage milk.

Figure 9D:
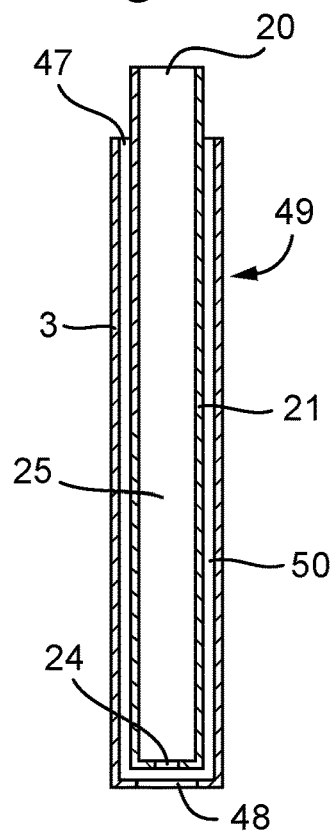

In the embodiment shown in FIG. 9D the froth wand 3 comprises a central steam channel 25 and a coaxial tube 49 surrounding the tubular wall 21 and forming therewith an ring shaped air channel 50 having an air intake opening 47 and an air outlet opening 48. Please note that the air intake opening 47 in this embodiment can optionally be connected to an air pump present in the device 2.

Figure 9E:
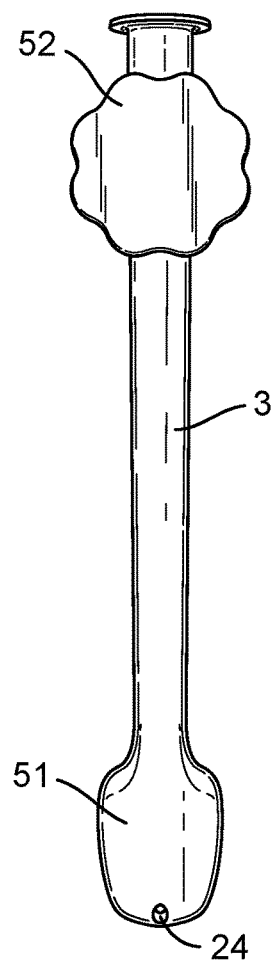
Figure 9F:
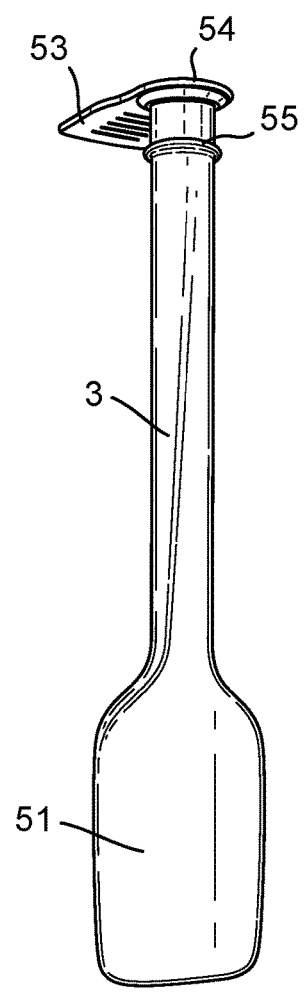
Figure 9G:
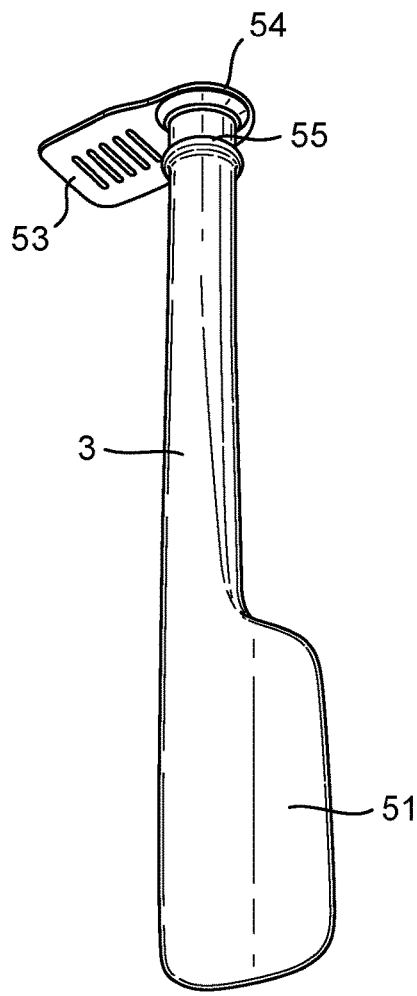

In FIGS. 9E-9G embodiments of the froth wand 3 are shown comprising a blade 51 at the steam outlet end 24 to improve stirring. The blade 51 can be shaped asymmetrical (FIG. 9G) or symmetrical (FIGS. 9E and 9F). The froth wand 3 shown in FIG. 9E further comprises a grip 52, for example a symmetrical grip, for gripping the froth wand 3 during stirring or a grip 53 (FIGS. 9F and 9G), for example an asymmetrical grip, to facilitate placing and removing the froth wand in and from the froth wand holder respectively. The embodiments of the froth wand 3 as shown in FIGS. 9F and 9G as well as those shown in FIGS. 13A and 13B further comprise an upper flange 53 at the steam inlet end by which the froth wand 3 can be supported in the seat 29 of the froth wand holder 19, wherein the upper flange 54 has a flat end face 54A for providing a sealing surface. De pending on the construction of the froth wand holder 19 in which the froth wand is to be held the froth wand 3 can further comprise a retention flange 55 (FIGS. 9F, 9G and 13A) spaced at a distance from the top flange 54.

Although the outside diameter of the embodiments of the froth wand as shown in FIGS. 9A-9D and 13A have a constant value over its complete length it will be clear that in other embodiments of a froth wand the outside diameter of the tubular wall can increase from the steam outlet end towards the steam inlet end. In the alternative embodiments shown in FIGS. 13B and 13C the tubular wall 21 comprises at least one portion 56, 56A, 56B extending from the steam inlet end in particular the upper flange 54 or free end of the froth wand, which portion has a decreasing outside diameter. This portion can be shaped such that it can be received without play in a mating froth wand opening 30 of the froth wand holder 19.

In FIGS. 10, 11, 12 and 14 embodiment of a system or device according are shown having alternative froth wand holder with regard to the froth wand holder 19 shown in FIGS. 1 and 2 in which the froth wand holder 19 is movably mounted in the device 2 for heating and frothing a beverage for being displaced from the operational position to the froth wand insertion position, and vice versa.

Figure 10A:
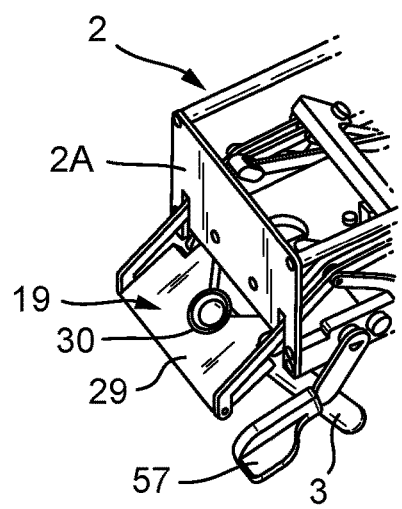
FIGS. 10A and 10B schematically show an embodiment of a system according to the invention comprising a froth wand holder positioned in the froth wand insertion position with a froth wand opening for receiving a froth wand.
Figure 10B:
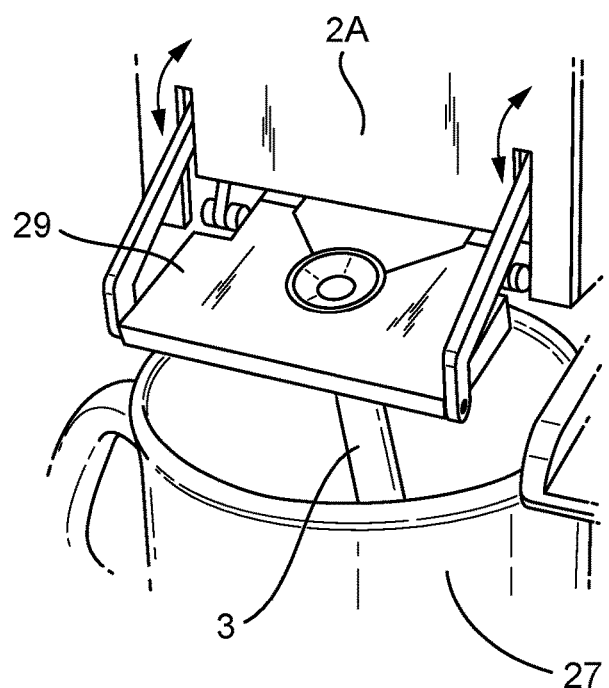

In FIGS. 10A and 10B a froth wand holder 19 is shown comprising a seat 19 with a froth wand opening 30. The froth wand holder 19 is positioned in the froth wand insertion position wherein the seat 29 with the froth wand opening 30 is situated outside the housing 2A of the device 2. After placement of the froth wand 3 in the froth wand opening 30 (FIG. 10B) the seat 29 can be pushed into the housing 2A. By means of a handle 57 the lid 31, which is now positioned within the housing, can be closed analogous to the embodiment as shown in FIGS. 1-3.

Figure 11A:
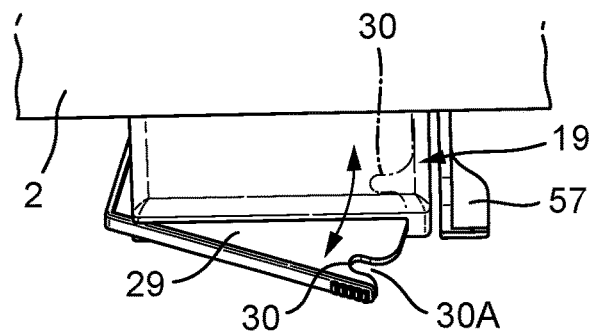
FIGS. 11A and 11B schematically show an embodiment of a system according to the invention comprising a froth wand holder positioned in the froth wand insertion position in which the horizontal seat of the froth wand holder comprises a radial slot opening into the froth wand opening.
Figure 11B:
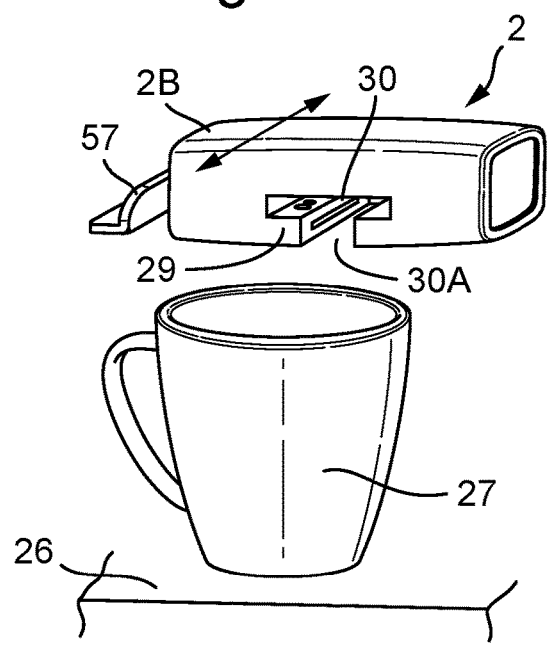

In the embodiment of the froth wand holder 19 shown in FIG. 11A in the froth wand insertion position the seat 29 comprises a radial slot 30A opening into the froth wand opening 30 so that a froth wand can be placed in the froth wand opening by displacing it from the side of the seat through the radial slot 30A. In this embodiment the froth wand holder in particular the seat 29 is rotatable from the froth wand insertion position to an operational position in which the froth wand opening 30 (indicated by broken lines) is not accessible from outside the device. Also in this embodiment the froth wand holder can comprise a handle 57 for manually displacing the lid of the froth wand holder. In the embodiment shown in FIG. 11B a froth wand can be inserted into the radial slot 30A from the front of the device 2. In this embodiment the lid 31 can be housed in a chamber portion 2B which is either fixed relative to the housing of the device or can be movable as indicated by the arrow. Also in this embodiment the froth wand holder can comprise a handle 57 for manually displacing the lid of the froth wand holder.

In the embodiment as shown in FIGS. 1 to 3 the froth wand is clamped by the seal 34 as the lid 31 is closed, in this manner sealing and clamping are performed by the same component. It will however be clear for a person skilled in the art that the froth wand holder can comprise any other known clamping mechanism for clamping the froth wand separate from sealing the froth wand. An exemplary embodiment of such a clamping mechanism 58 is disclosed in FIG. 14B. The clamping mechanism 58 comprises a movable engagement part 59, arranged for being displaced from an idle position at least partly protruding into the froth wand opening 30 (indicated by the solid line) to an activating position 59' outside the froth wand opening indicated by broken lines. The clamping mechanism 58 further comprises two movable clamping arms or parts 60, 60A coupled to said displaceable engagement part 59, 59' and are in the shown embodiment coupled together via a rotation shaft 61. The movable clamping part 59 is coupled to the arms 60, 60A such that the arms 60, 60A of the clamping part is positioned into a releasing position RP for releasing or receiving the froth wand when the engagement part is in the idle position and such that the clamping part is positioned in a clamping position CP for clamping the froth wand when the engagement part is in the activating position i.e. when the engagement part 59A is engaged by the froth wand and pushed inward by inserting the froth wand into the froth wand opening. In stead of using the froth wand itself as operator for activating the clamping mechanism, the device 2 can comprise a separate clamping activator, which positions the clamping mechanism in either a releasing position for receiving or releasing the froth wand or a clamping position for clamping the froth wand. Such a clamping activator preferably is formed by the handle 57 or the lid 31 which is used to move the froth wand holder from the froth wand insertion position to the operational position and can be used for simultaneously and automatically displacing the clamping mechanism from the releasing position into the clamping position when it moves the froth wand holder from the froth wand insertion position to the operational position. In particular the clamping mechanism is arranged for clamping the froth wand at least in the operational position.

In the exemplary embodiment of the froth wand holder 19 as shown in FIGS. 12A-12E the froth wand holder 19 also comprises a seat 29 with a radial slot 30A opening into the froth wand opening 30 so that a froth wand can be placed in the froth wand opening by displacing it from the front of the seat through the radial slot 30A. In this embodiment the froth wand holder in particular the seat 29 is rotatable from the froth wand insertion position (shown in FIGS. 12A and B) to an operational position (shown in FIG. 12C) in which the froth wand opening 30 is not accessible from outside the device. The froth wand holder 19 comprises a handle 57' for manually rotating the seat 29 of the froth wand holder 19. In this embodiment the froth wand holder 19 comprises a froth wand ejector 62 for ejecting the froth wand 3 out of the froth wand holder 19. In the shown embodiment the froth wand ejector 62 is arranged for ejection the froth wand 3 through the radial slot 30A as will be explained below.

Figure 12A:
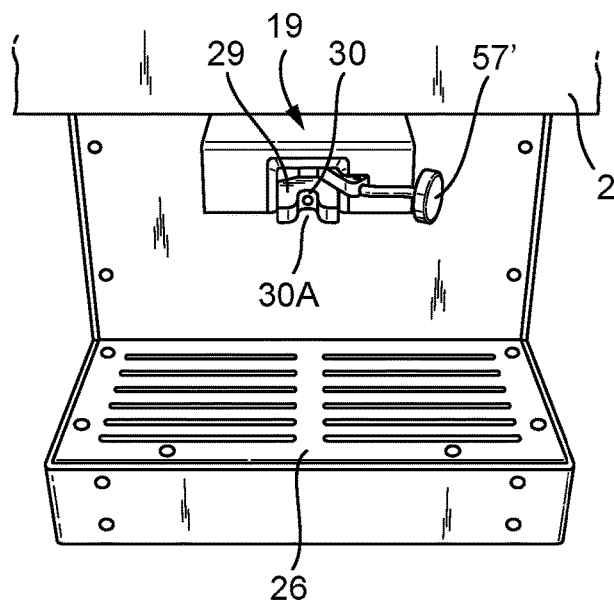
FIGS. 12A, 12B, 12C, 12D, and 12E schematically show an embodiment of a system according to the invention comprising a rotatable froth wand holder comprising a handle for manually displacing the froth wand holder and a froth wand ejector.
Figure 12B:
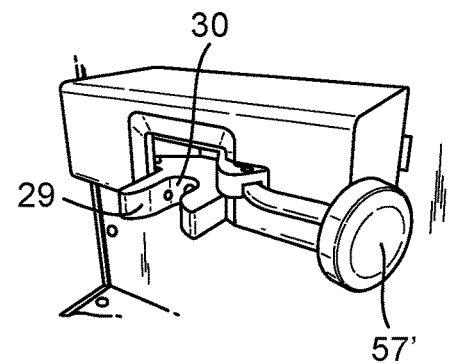
Figure 12C:
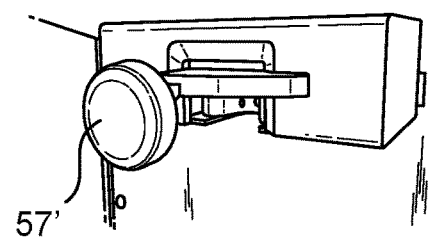
Figure 12D:
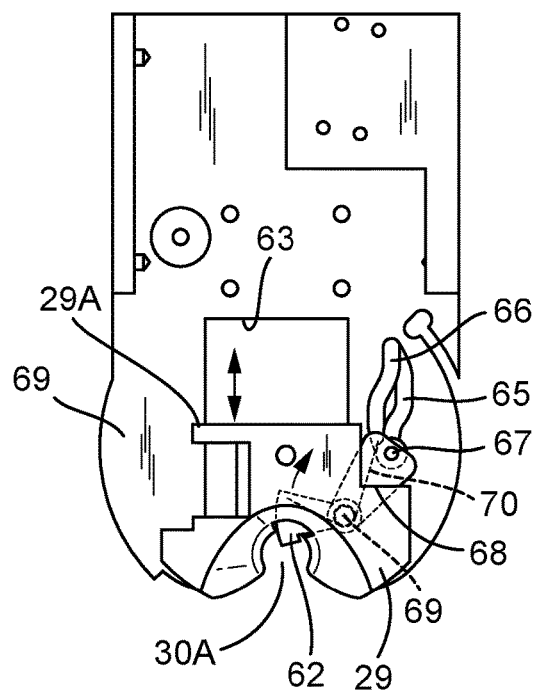
Figure 12E:
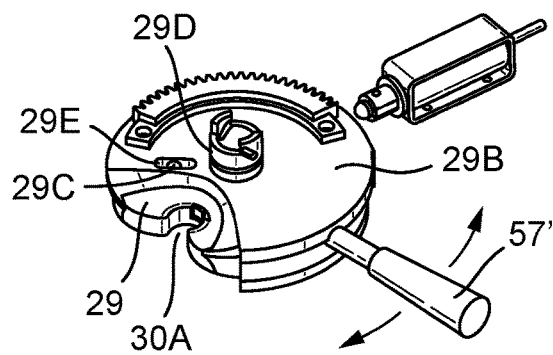
Figure 13A:
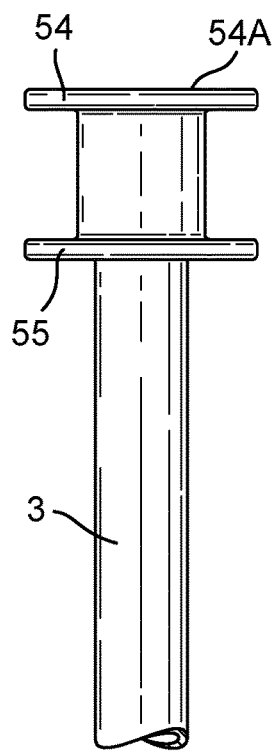
FIGS. 13A, 13B, 13C schematically show several embodiments of a froth wand according to the invention with different configurations at the steam inlet end.
Figure 13B:
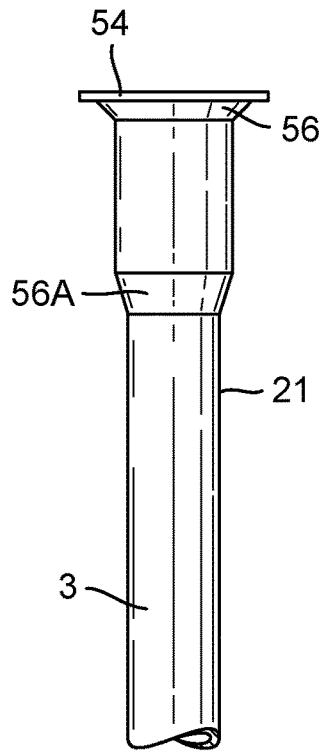
Figure 13C:
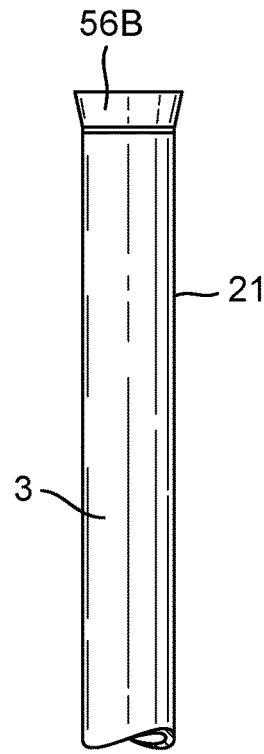

The seat 29 of the froth wand holder is mounted displaceable from the froth wand insertion position shown in FIG. 12D in which the stop end 29A of the seat 29 is spaced from a stop surface 63 of a seat guide 64 of the froth wand holder up to the operational position in which the stop end 29A abuts the stop surface 63. This displacement is effected by rotation of an upper seat part 29B (FIG. 12E) which is rotatably mounted to the seat 29 via a centre boss 29D. In the upper seat part 29B a slot 29E is provided in which a slider 29C fixed to the seat 29 is received. Upon rotation of the upper seat part 29B by operating on the handle 57' the side edges of the slot 29D engage with the slider 29C as a result of which the seat 29 is displaced as indicated by the arrow in FIG. 12D. The seat guide 64 of the froth wand holder 19 comprises two cam tracks 65, 66 in which a boss 67 is received and can be displaced during movement of the seat 29. The boss 67 is connected to a rotation axis 69 via an arm 68 and the froth wand ejector 62 (shaped as an arm) is also rotatably connected to the rotation axis 69 and is loaded by a spring 70. In this manner the spring 70 is loaded when the froth wand holder is displaced from the froth wand insertion position into the operating position in which the boss 67 is guided in the track 65 and is released for actuating the ejector arm 62 to eject the froth wand from the radial slot 30A when the froth wand holder is displaced from the operating position into the froth wand insertion position in which the boss 67 is guided in the track 66. In this manner the froth wand is ejected automatically. Please note that the system can be arranged such that the seat 29 can only be displaced from the operational position to the froth wand insertion/releasing position after steam has been supplied through the froth wand or upon a specific instruction thereto, e.g. given by pressing a respective button suited therefore in order to improve safety. Thus using such a device leads to a method of preparing a beverage in which the step of positioning a froth wand in the froth wand holder of the device for heating and frothing a beverage is performed when the froth wand holder is positioned in the froth wand insertion position, the step of displacing the froth wand holder from the froth wand insertion position to the operational position takes place by rotating the seat of the froth wand holder by application of a handle, the step of displacing the froth wand holder from the operational position to the froth wand insertion position takes place only after steam is supplied to and through the froth wand, where after the froth wand is released automatically from the froth wand holder.

Figure 14A:
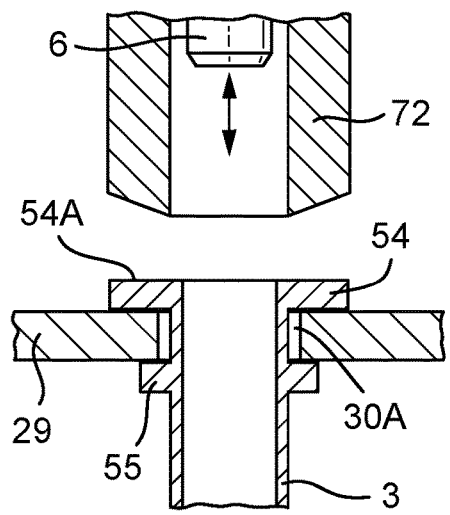
FIGS. 14A, 14B, 14C, and 14D schematically show an embodiment of a system according to the invention in which the froth wand holder comprises froth wand clamping means and in which the steam nozzle is configured to be introduced and received in the steam channel of the froth wand.
Figure 14B:
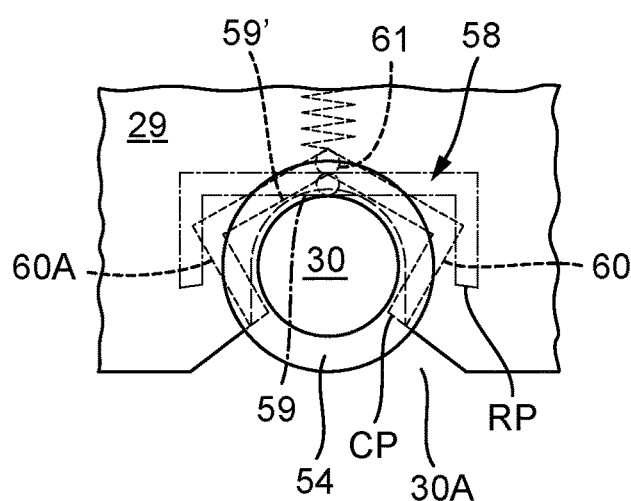
Figure 14C:
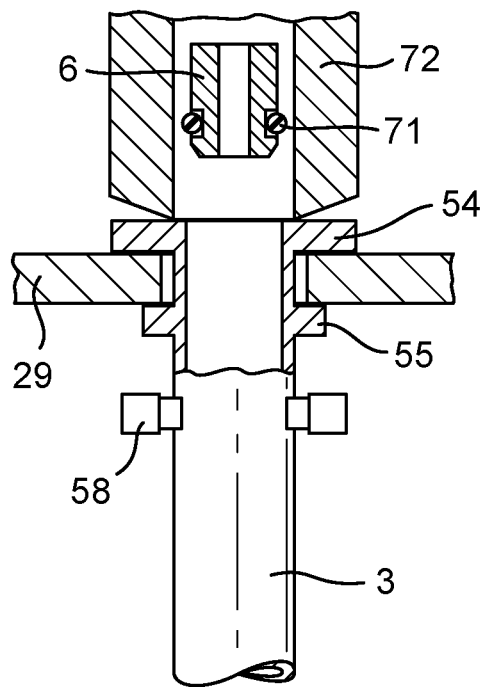
Figure 14D:
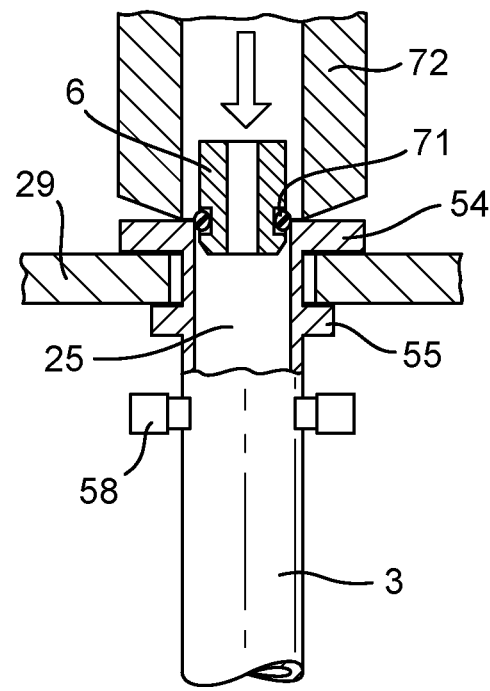

In the embodiment shown in FIGS. 1-3 the lid 31 comprises a conduit 31A which ensures communication of the nozzle 6 (in the shown embodiment extending horizontally) and the steam channel of the froth wand in operational position. However, it will be clear to a person skilled in the art that the invention is not limited to such an embodiment and that the nozzle 6 can e.g. also be oriented vertically. Such an embodiment is for example disclosed in FIGS. 14A-14D. In the embodiment shown in these FIGS. 14A-14D the steam nozzle 6 is movably mounted in the device 2 for heating and frothing a beverage. As follows from FIG. 14D the steam nozzle 44 is further dimensioned so that it can be received in the steam channel 25 of the froth wand 3. The steam nozzle 6 comprises a seal 71 for sealing against an inner surface of the tubular wall enclosing the steam channel. As shown in the Figures the steam nozzle 44 is movable arranged within a guide tube 72 which is also movably mounted. This guide tube 72 (part of the lid or as replacement of the lid) is first lowered to seal against the upper flange 54 of the froth wand and to provide clamping in addition to the clamping realized by the clamping means 58 (FIG. 14C). Thereafter the steam nozzle 6 is lowered into the steam channel of the froth wand as indicated in FIG. 14D, where after steam can be supplied to and through the steam nozzle and steam channel.

Figure 15:
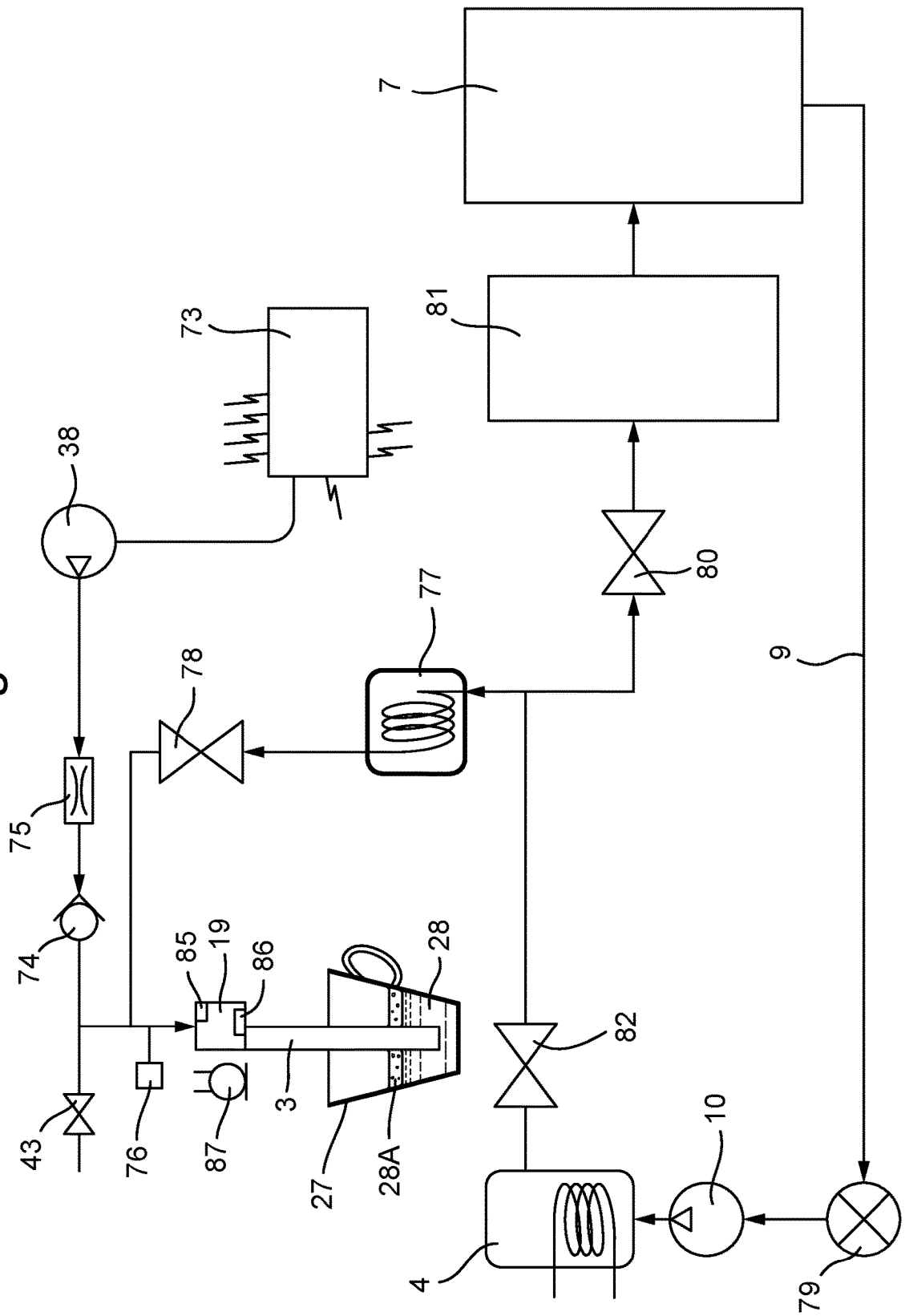
FIG. 15 schematically shows a first embodiment of the system according to the invention in which the interconnection between constituting components is shown schematically.

In FIG. 15 schematically a first embodiment of a schedule of a system according to the invention is shown in which the interconnection between constituting components is shown schematically. The device of the system for heating and frothing a beverage comprises a controller 73 which operationally connected to the steamer 4 for controlling the operation of the steamer. In addition the controller 73 is operationally connected to the air pump for controlling the operation of the air pump and operationally connected to the cold water pump 10 for controlling the operation of the cold water pump and operationally connected to the valve 43 for positioning the valve in a respective connecting position. In case an electromagnetically controlled froth wand ejector is used the controller 73 is also operationally connected to the froth wand ejector for either activating or deactivating the froth wand ejector. The system further comprises the following shelf components: a non-return valve 74, an air restrictor 75, a duck-bill valve 76, an additional thermo block 77 and a steam delivery valve 78, a water flow meter 79, a steam dump valve 80, a condenser 81 and a steam charge valve 82. In the second schedule embodiment shown in FIG. 16 additionally a steam pump 83 and a pressure regulator 84 are enclosed in the depicted manner.

Figure 16:
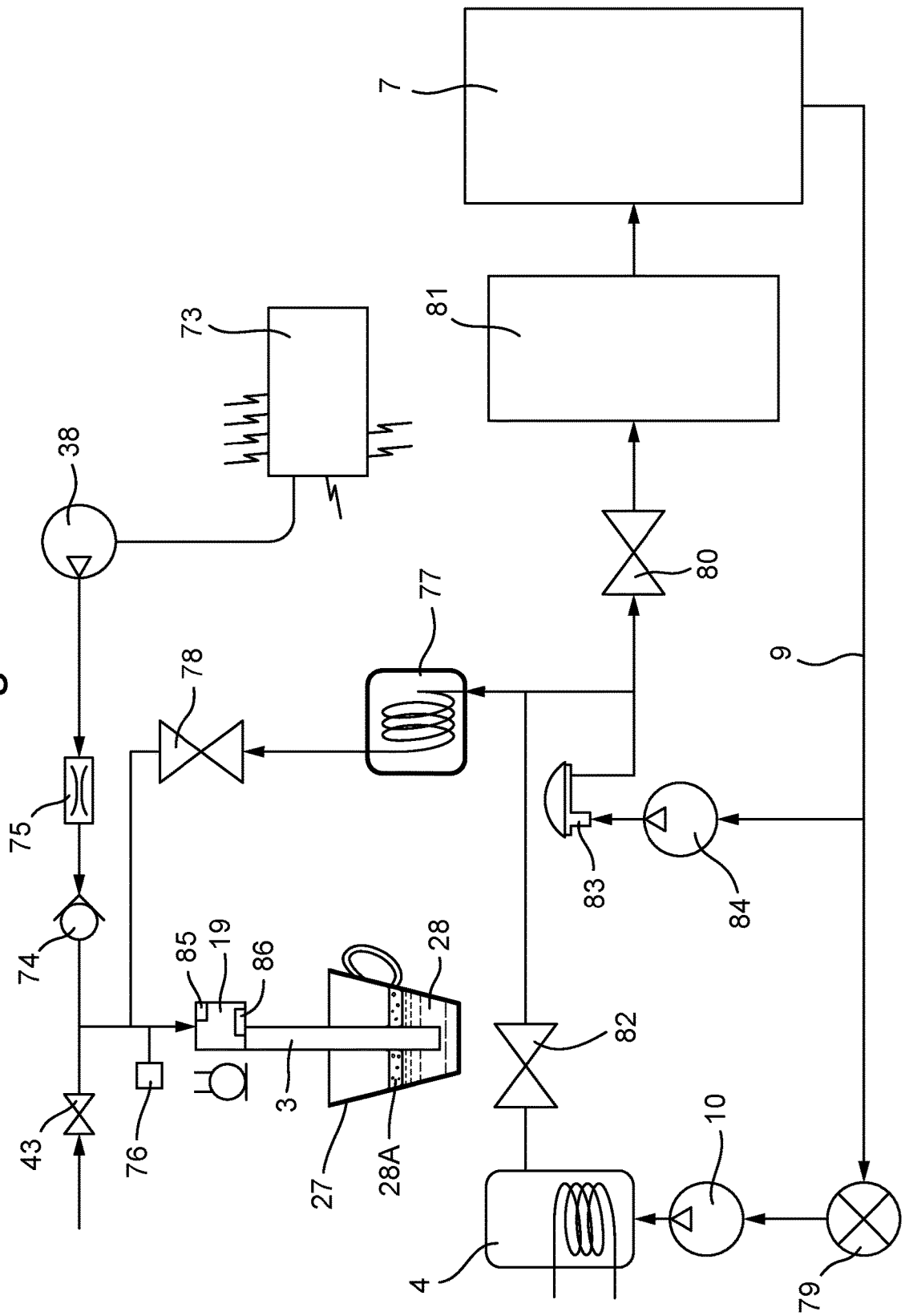
FIG. 16 schematically shows a second embodiment of the system according to the invention in which the interconnection between constituting components is shown schematically, and FIG. 17 schematically shows a part of an embodiment of a system according to the invention comprising a microphone as temperature sensor indicating the microphone positions.

Both systems shown in FIGS. 15 and 16 further comprise a froth wand holder detector 85 for detecting whether the froth wand holder 19 is positioned in the operating position. This froth wand holder detector 85 is operationally connected to the controller 73 for supplying a signal to the controller 73 indicative for whether the froth wand holder 19 is positioned in the operating position or not. The controller 73 is then arranged for deactivating the (electromagnetically actuatable) froth wand ejector when the signal received from the froth wand holder detector 85 indicates that the froth wand holder 19 is in the operating position. The froth wand holder detector 85 is further arranged for detecting whether the froth wand holder 19 is positioned in the froth wand insertion position and can supply a signal to the controller 73 indicative for whether the froth wand holder 19 is positioned in the froth wand insertion operating position or not. The controller 73 is then arranged for activating the froth wand ejector when the signal received from the froth wand holder detector 85 indicates that the froth wand holder is in the froth wand insertion position and the controller 73 has deactivated the steamer 4 within a predetermined time period before receiving said signal from the froth wand holder detector 85.

The controller 73 is arranged for automatically deactivating a component to which it is operationally connected when the signal from the froth wand holder detector 85 indicates that the froth wand holder 19 is in the froth wand insertion position and/or arranged for activating a component to which it is operationally connected only when the signal from the froth wand holder detector 85 indicates that the froth wand holder is in the operating position.

In the schedules of the systems shown in FIGS. 15 and 16 the device further includes a froth wand presence detector 86 for detecting whether a froth wand 3 is held in the froth wand holder 19. The froth wand presence detector 86 is operationally connected to the controller 73 for supplying thereto a froth wand presence signal indicative of whether or not a froth wand 3 is held in the froth wand holder 19. The controller 73 is then arranged for controlling the component which is operationally connected to it at least in dependence of the froth wand presence signal.

Figure 17:
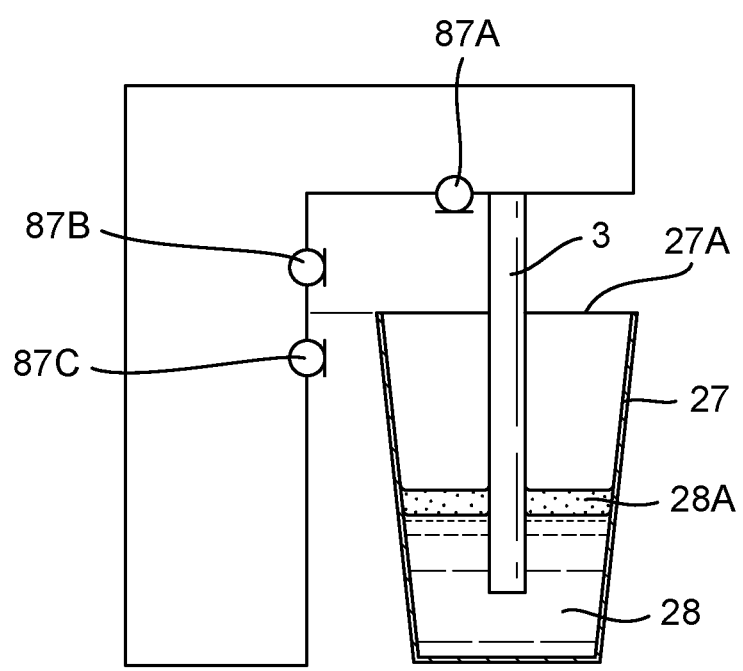

In the schedules of the systems shown in FIGS. 15 and 16 the system in particular the device further includes a froth temperature sensor 87 for sensing a temperature of froth 28A in the cup 27. The temperature sensor 87 is operationally connected to the controller 73 for supplying thereto a signal indicative for the measured froth temperature. The froth temperature sensor comprises at least one microphone (see FIG. 17) which can be positioned above (87A) the cup 27, beside (87B) the cup 27 above the upper edge 27A of the cup 27 or beside (87C) the cup below the upper edge 27A of the cup 27. Measuring the temperature of the froth 28A then includes recording sound from the froth 28A and the step of deriving the temperature from the recorded sound by means of a suitable algorithm stored in the controller 73. Depending on the measured temperature the controller 73 can then decide whether or not to deactivate the steamer 4. The controller 73 therefore controls the method of heating and frothing and preparing a beverage based on information gathered by the respective sensors 79, 85, 86 and 87.

The invention claimed is:

1. A system for heating and frothing a beverage, the system comprising;
    a device for heating and frothing a beverage and a froth wand, said device for heating and frothing a beverage including:
    a steamer,
    a steam conduit connecting the steamer to a steam nozzle, and
    a froth wand holder for removably holding a froth wand, said froth wand being a disposable froth wand comprising a tubular wall having a steam inlet end comprising a steam inlet, a steam outlet end comprising a steam outlet separate from the steam inlet, and a steam channel extending between the steam inlet and the steam outlet,
    said froth wand holder comprising a horizontal seat with a froth wand opening for receiving a part of the froth wand, the horizontal seat being arranged for holding the disposable froth wand at least in an operational position in the device for heating and frothing a beverage, in which operational position the steam nozzle is in communication with the steam inlet of the disposable froth wand;
    a clamping mechanism for clamping the disposable froth wand at least in the operational position of the froth wand holder and in which supplying steam is enabled only when the froth wand holder is clamped in the operational position, and
    a clamping activator,
    wherein the clamping mechanism comprises a movable clamping part positioned in a releasing position for receiving or releasing the froth wand when the froth wand holder is in a froth wand insertion position, said movable clamping part cooperating with the clamping activator when the froth wand holder is in the operational position so as to be displaced into a clamping position for clamping the froth wand in the operational position.

2. A system for heating and frothing a beverage according to claim 1, wherein the froth wand holder is movably mounted in the device for heating and frothing a beverage, for being displaced from the operational position to the froth wand insertion position, and vice versa.

3. A system for heating and frothing a beverage according to claim 2, wherein the froth wand holder is rotatable.

4. A system for heating and frothing a beverage according to claim 2, wherein the froth wand holder comprises a handle for manually displacing the froth wand holder.

5. A system for heating and frothing a beverage according to claim 1, wherein the horizontal seat comprises a radial slot opening into the froth wand opening.

6. A system for heating and frothing a beverage according to claim 1, wherein the clamping mechanism comprises a movable engagement part arranged for being displaced from an idle position at least partly protruding into the froth wand opening to an activating position outside the froth wand opening, wherein the movable clamping part is coupled to said movable engagement part, said movable clamping part being coupled to said movable engagement part such that the movable clamping part is positioned into the releasing position for releasing or receiving the froth wand when the movable engagement part is in the idle position and such that the movable clamping part is positioned in the clamping position for clamping the froth wand when the movable engagement part is in the activating position.

7. A system for heating and frothing a beverage according to claim 1, wherein the froth wand holder comprises a froth wand ejector for ejecting the froth wand out of the froth wand holder.

8. A system for heating and frothing a beverage according to claim 7,
    wherein the horizontal seat comprises a radial slot opening into the froth wand opening; and
    wherein the froth wand ejector is arranged for ejecting the froth wand through the radial slot.

9. A system for heating and frothing a beverage according to claim 8, wherein the froth wand ejector comprises a spring actuated ejector arm and a spring, said spring being loaded when the froth wand holder is displaced from the froth wand insertion position into the operating position and released for actuating the ejector arm when the froth wand holder is displaced from the operating position into the froth wand insertion position.

10. A system for heating and frothing a beverage according to claim 1, wherein the froth wand holder comprises a lid which is mounted displaceable relative to the horizontal seat.

\* \* \* \* \*